United States Patent
Onishi et al.

(10) Patent No.: US 10,552,458 B2
(45) Date of Patent: Feb. 4, 2020

(54) DATA TRANSMISSION DEVICE, DATA SHARING SYSTEM, DATA SHARING METHOD, AND MESSAGE EXCHANGING SYSTEM

(71) Applicant: TOYOTA JIDOSHA KABUSHIKI KAISHA, Toyota-shi, Aichi (JP)

(72) Inventors: Ryokichi Onishi, Kawasaki (JP); Makiko Matsumoto, Tokyo (JP); Akira Yoshioka, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 553 days.

(21) Appl. No.: 14/767,776

(22) PCT Filed: Feb. 27, 2014

(86) PCT No.: PCT/JP2014/054872
§ 371 (c)(1),
(2) Date: Aug. 13, 2015

(87) PCT Pub. No.: WO2014/133078
PCT Pub. Date: Sep. 4, 2014

(65) Prior Publication Data
US 2015/0379114 A1 Dec. 31, 2015

(30) Foreign Application Priority Data
Mar. 1, 2013 (JP) .................. 2013-040763

(51) Int. Cl.
*G06F 16/00* (2019.01)
*G06F 16/28* (2019.01)
(Continued)

(52) U.S. Cl.
CPC ........ *G06F 16/285* (2019.01); *G06F 16/9535* (2019.01); *H04L 51/046* (2013.01); *H04L 65/403* (2013.01); *H04L 67/42* (2013.01)

(58) Field of Classification Search
CPC ................................. G06F 17/30598
(Continued)

(56) References Cited

U.S. PATENT DOCUMENTS

2010/0011072 A1* 1/2010 Mishchenko .......... G06Q 10/10
709/206
2010/0223332 A1 9/2010 Maxemchuk et al.
2010/0223436 A1* 9/2010 Yamagishi ........ H04L 29/12028
711/156

FOREIGN PATENT DOCUMENTS

| CN | 101657800 A | 2/2010 |
| JP | 2005-148956 A | 6/2005 |
| JP | 2012-133726 A | 7/2012 |

OTHER PUBLICATIONS

B.H. Bloom. "Space/time trade-offs in hash coding with allowable errors". Communications of the ACM (CACM1970); Jul. 1970; vol. 13, No. 7, pp. 422-426.

* cited by examiner

Primary Examiner — Chelcie L Daye
(74) Attorney, Agent, or Firm — Oliff PLC

(57) ABSTRACT

A data transmission device that transmits data to another node, the data transmission device including: data storing unit for storing data; summary information storing unit for classifying data stored in the data storing unit into prescribed groups and for storing summary information that represents the number of pieces of data for each group; receiving unit for receiving summary information from the other node; selecting unit for selecting data to be transmitted based on the summary information received from the other node; and (Continued)

transmitting unit for transmitting the data selected by the selecting unit. The selecting unit favorably preferentially selects data included in a group with a smaller number of pieces of data based on the summary information received from the other node. Due to such a configuration, information with a high possibility of not being possessed by a communication partner can be selected and transmitted in a data sharing system.

20 Claims, 18 Drawing Sheets

(51) Int. Cl.
  *G06F 16/9535*  (2019.01)
  *H04L 12/58*   (2006.01)
  *H04L 29/06*   (2006.01)
(58) Field of Classification Search
  USPC .......................................................... 707/737
  See application file for complete search history.

[Fig. 1]
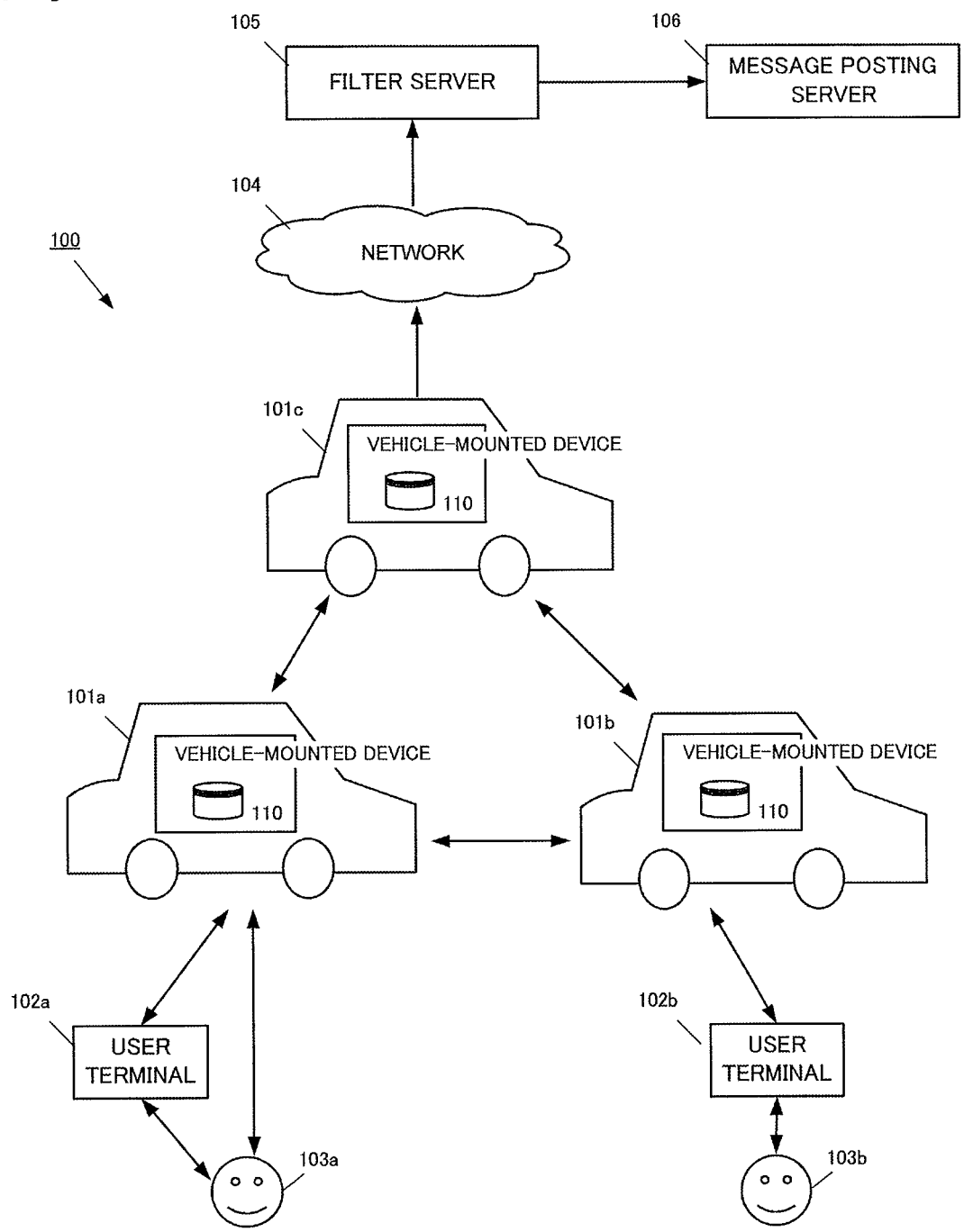

[Fig. 2]
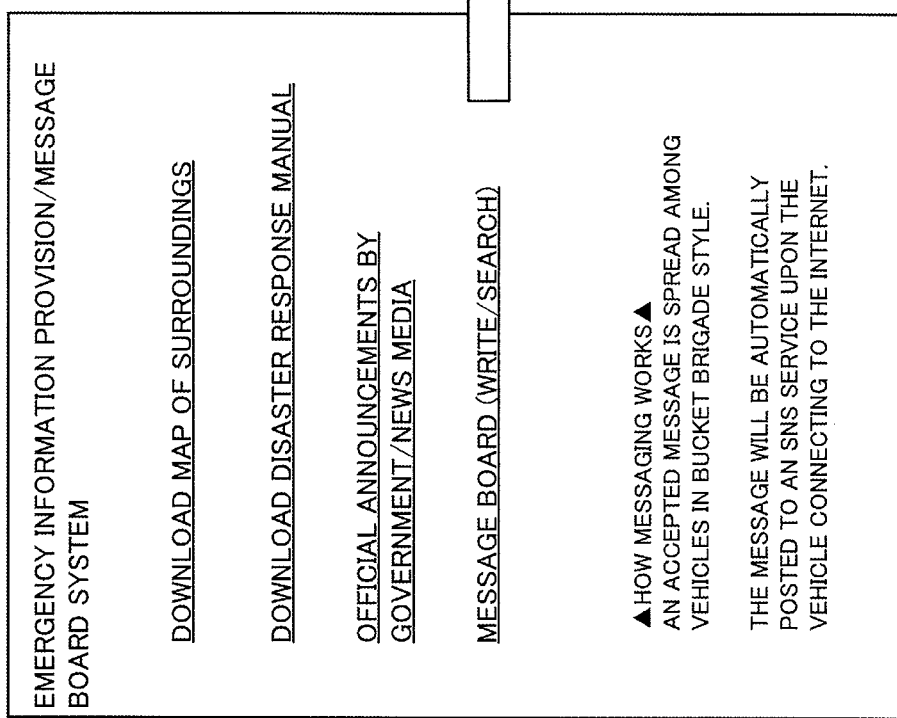
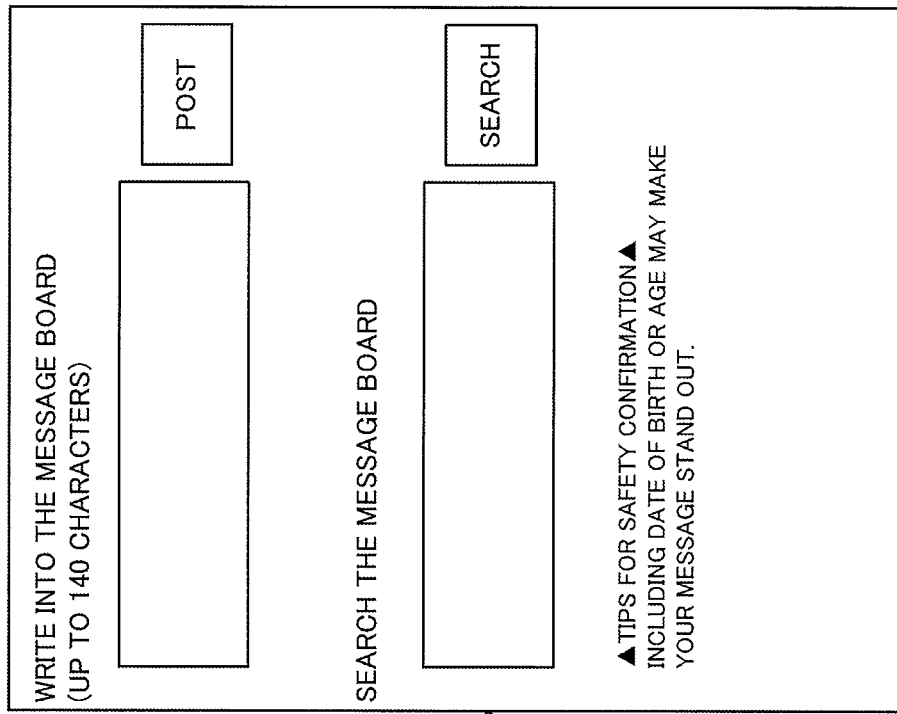

[Fig. 3]
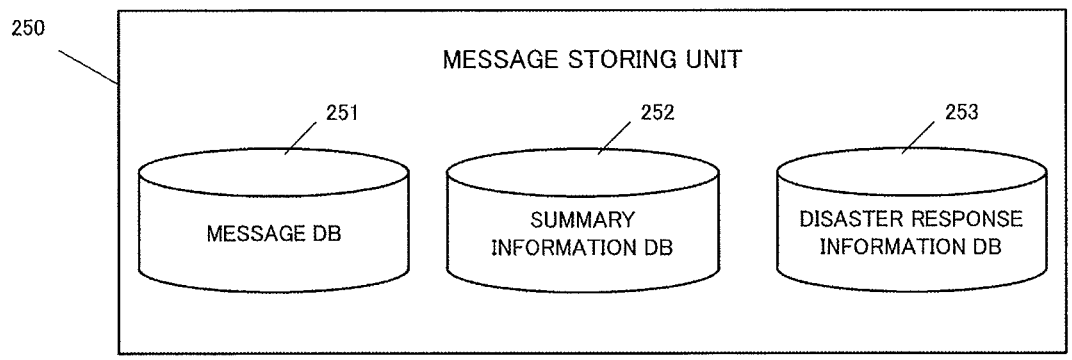
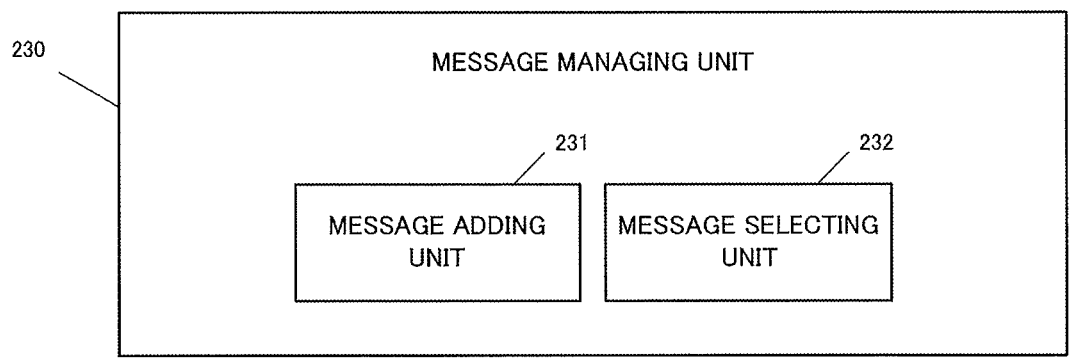
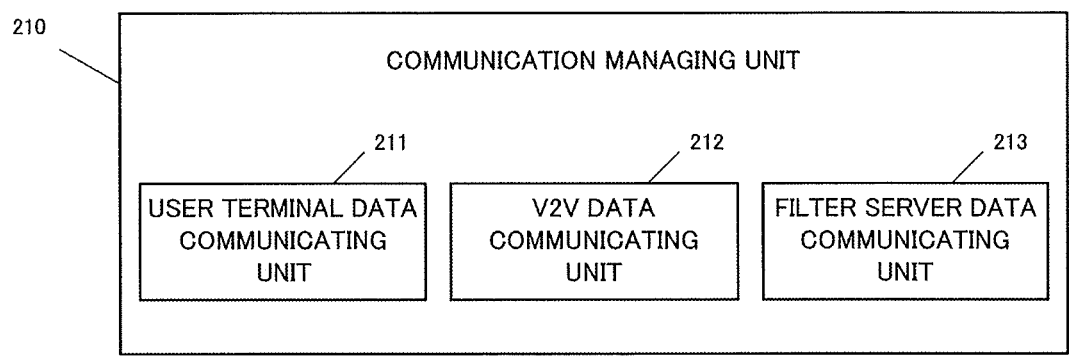

[Fig. 4]
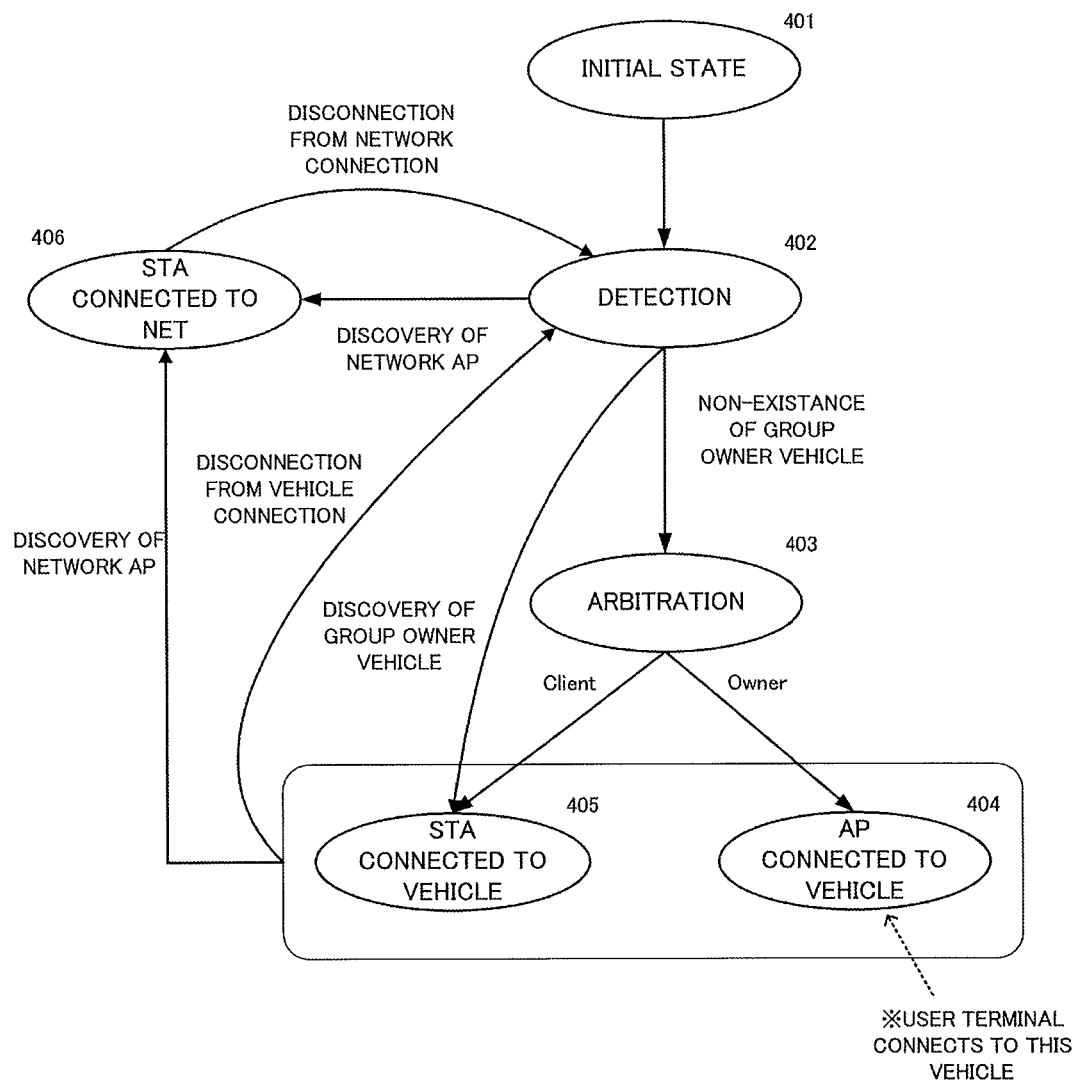

[Fig. 5]
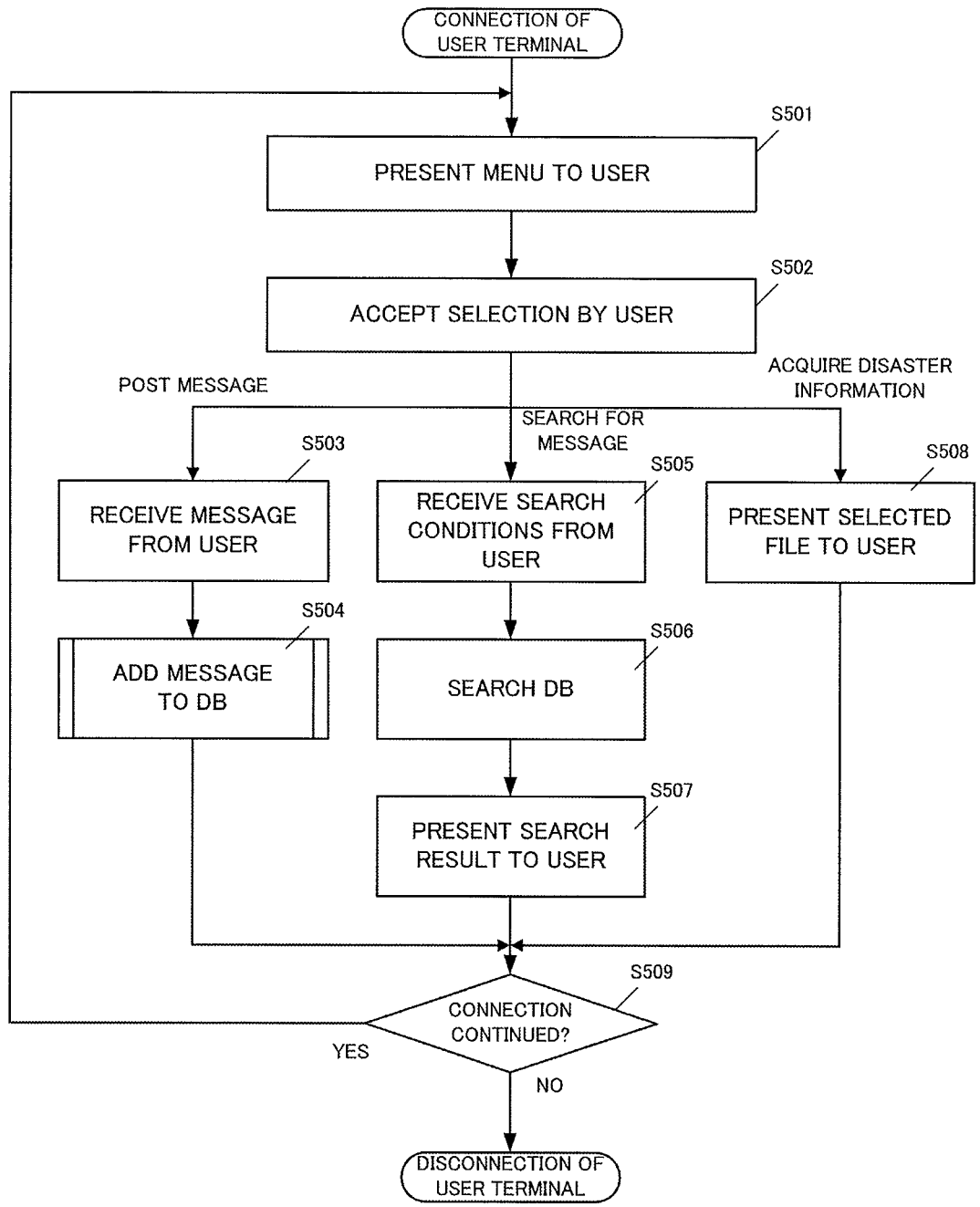

[Fig 6]

| INITIAL REGISTRATION DATE/TIME 601 | DATE AND TIME OF REGISTRATION OF MESSAGE BY USER |
|---|---|
| INITIAL REGISTRATION POSITION 602 | LOCATION OF REGISTRATION OF MESSAGE BY USER |
| MESSAGE BODY 603 | TEXT |
| OPTIONAL — INITIAL REGISTRATION USER ID 604 | ID OF INITIAL REGISTRATION USER (E.G. MAC ADDRESS OF TERMINAL) |
| OPTIONAL — INITIAL REGISTRATION NODE ID 605 | ID OF NODE HAVING ACCEPTED INITIAL REGISTRATION |
| OPTIONAL — SIGNATURE 606 | DIGITAL SIGNATURE FOR MESSAGE |
| OPTIONAL — SERVER UPLOAD FLAG 607 | INDICATES WHETHER OR NOT MESSAGE HAS ALREADY BEEN TRANSMITTED TO SERVER |
| OPTIONAL — HOP COUNT 608 | INDICATES NUMBER OF TIMES TRANSMITTED |
| OPTIONAL — GROUP ID 609 | ID OF GROUP TO WHICH MESSAGE BELONGS |
| INITIAL REGISTRATION FLAG 610 | INDICATES WHETHER MESSAGE HAS BEEN DIRECTLY ACCEPTED FROM USER |
| PREVIOUS TRANSMISSION TIME 611 | TIME OF PREVIOUS TRANSMISSION OF MESSAGE BY HOST VEHICLE |

[Fig. 7]
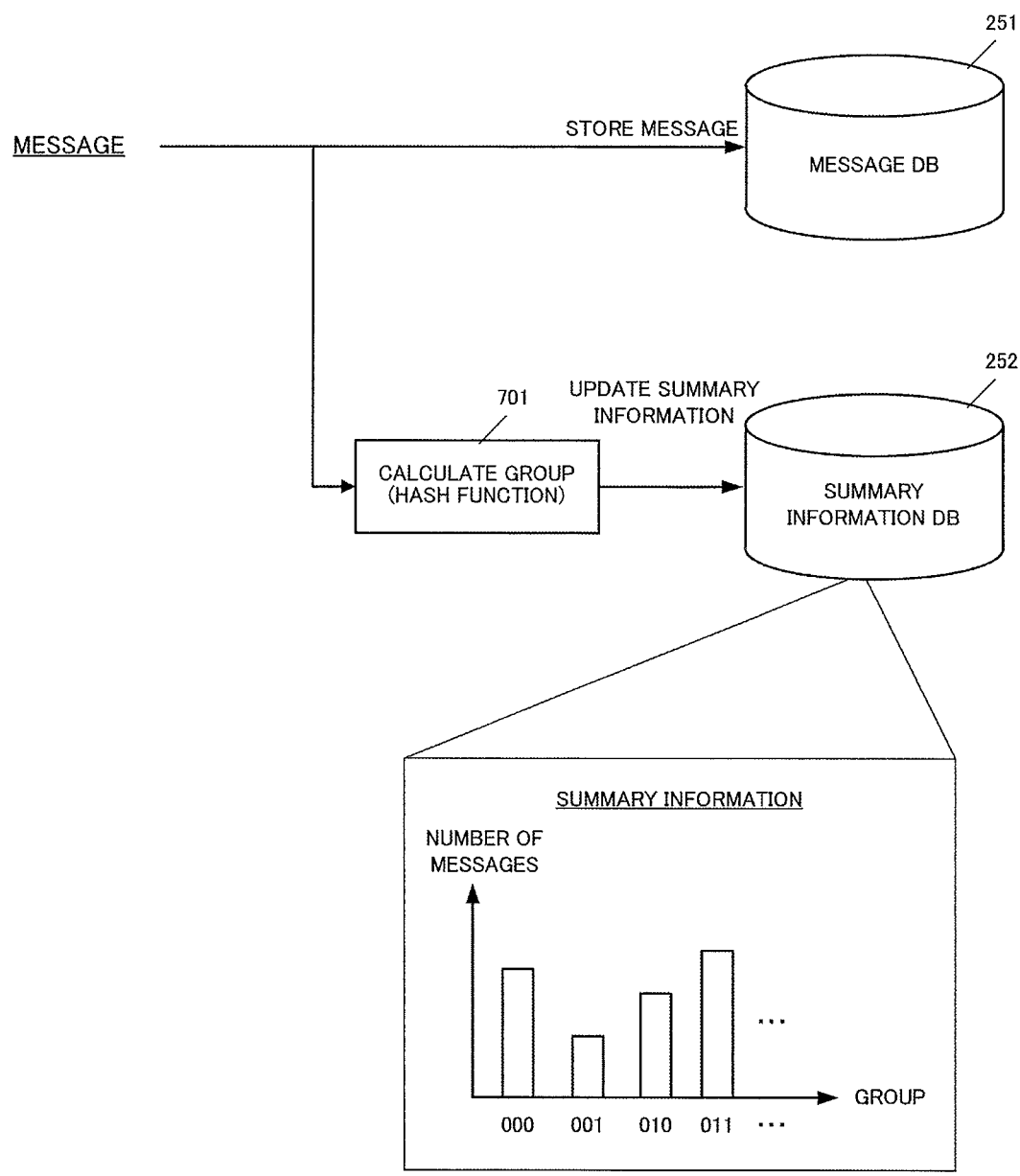

[Fig. 8]
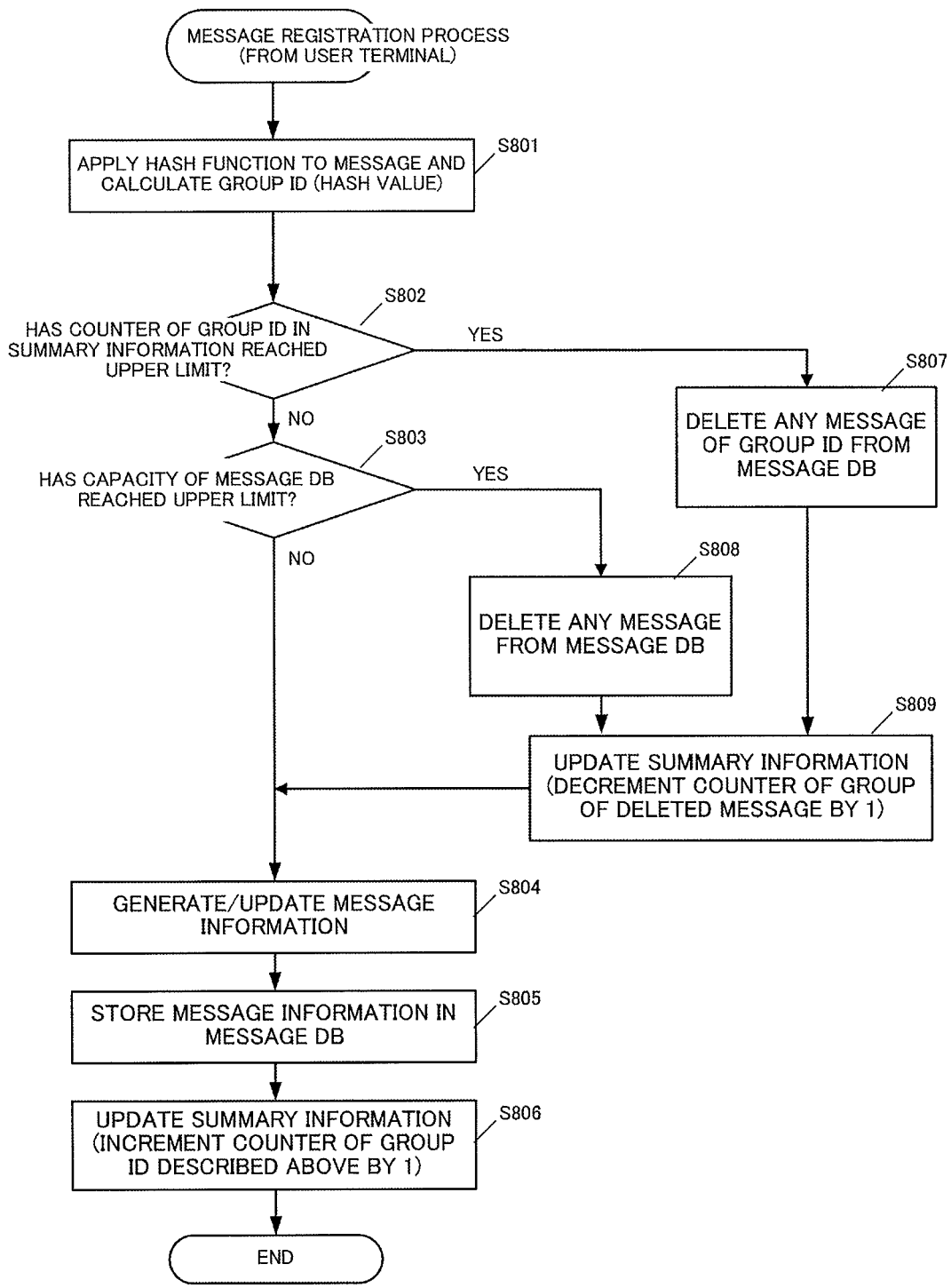

[Fig. 9]
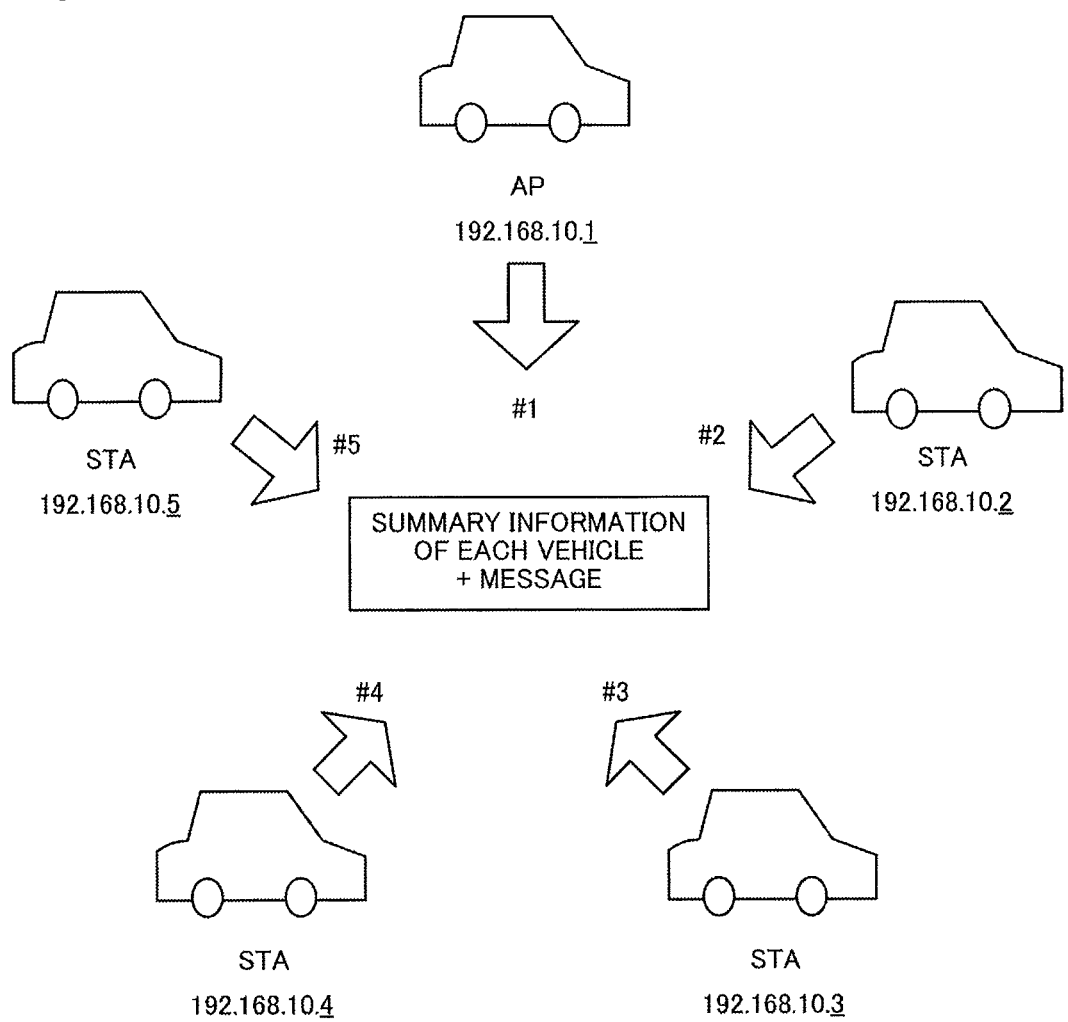

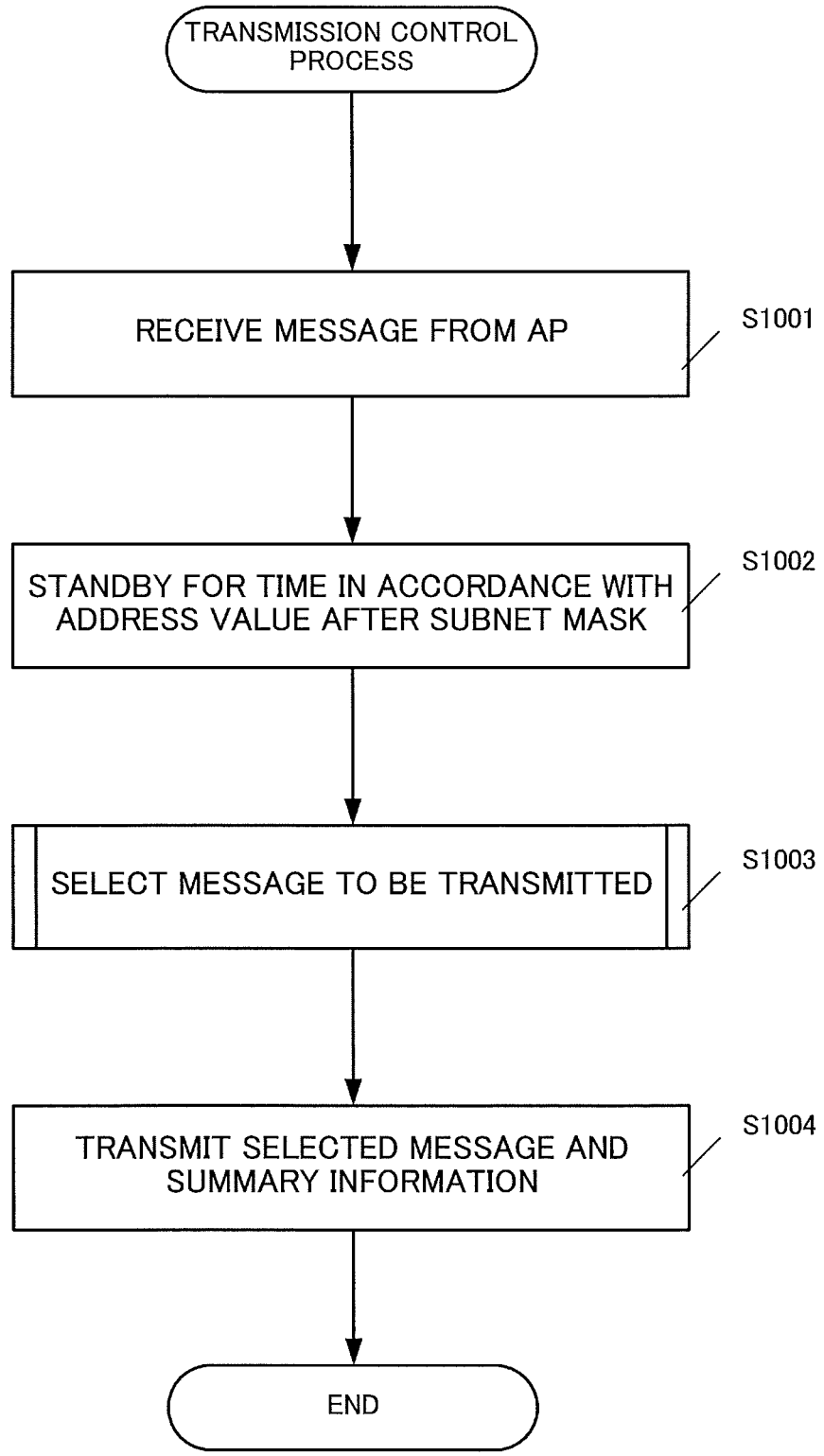
[Fig. 10]

[Fig. 11]
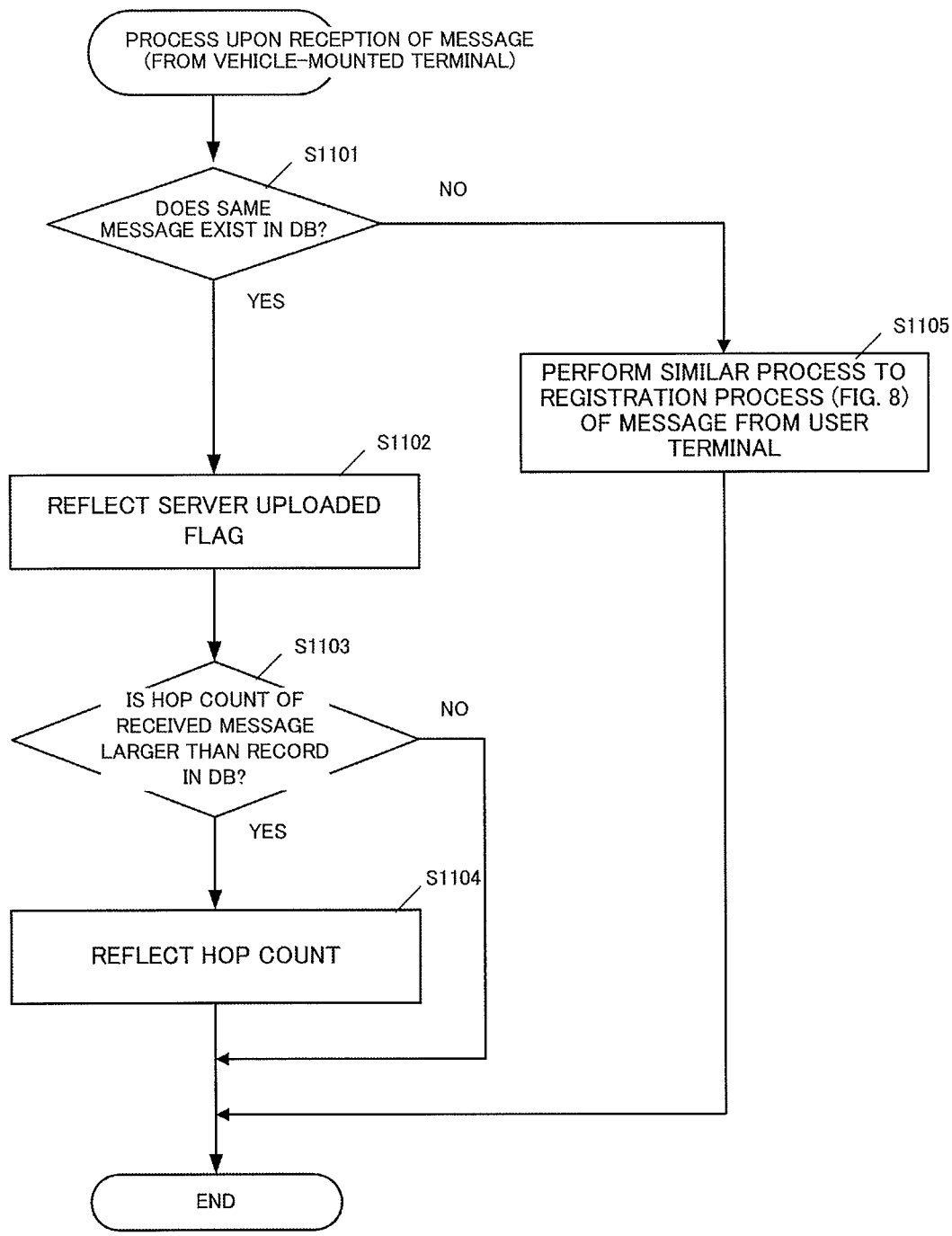

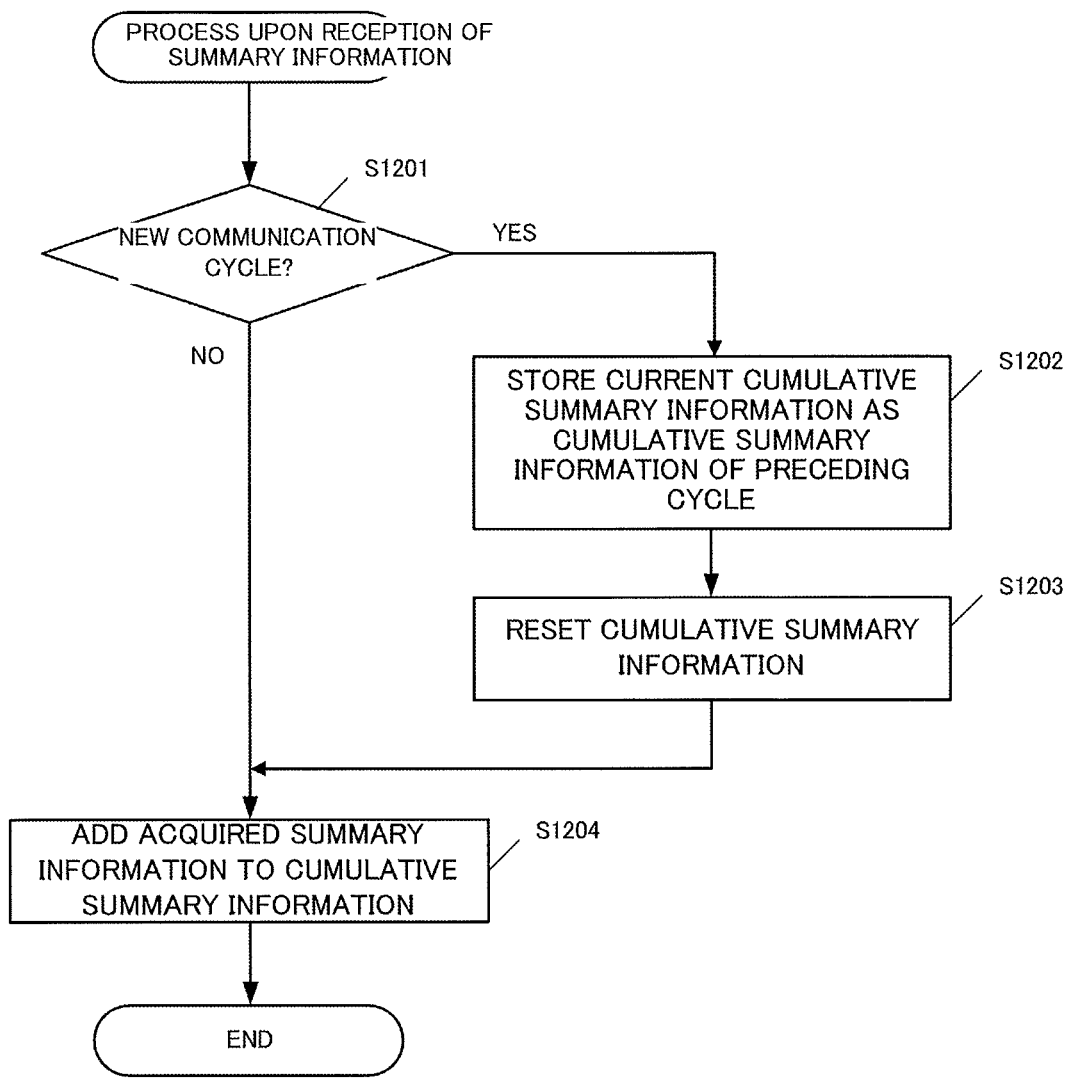
[Fig. 12]

[Fig. 13]
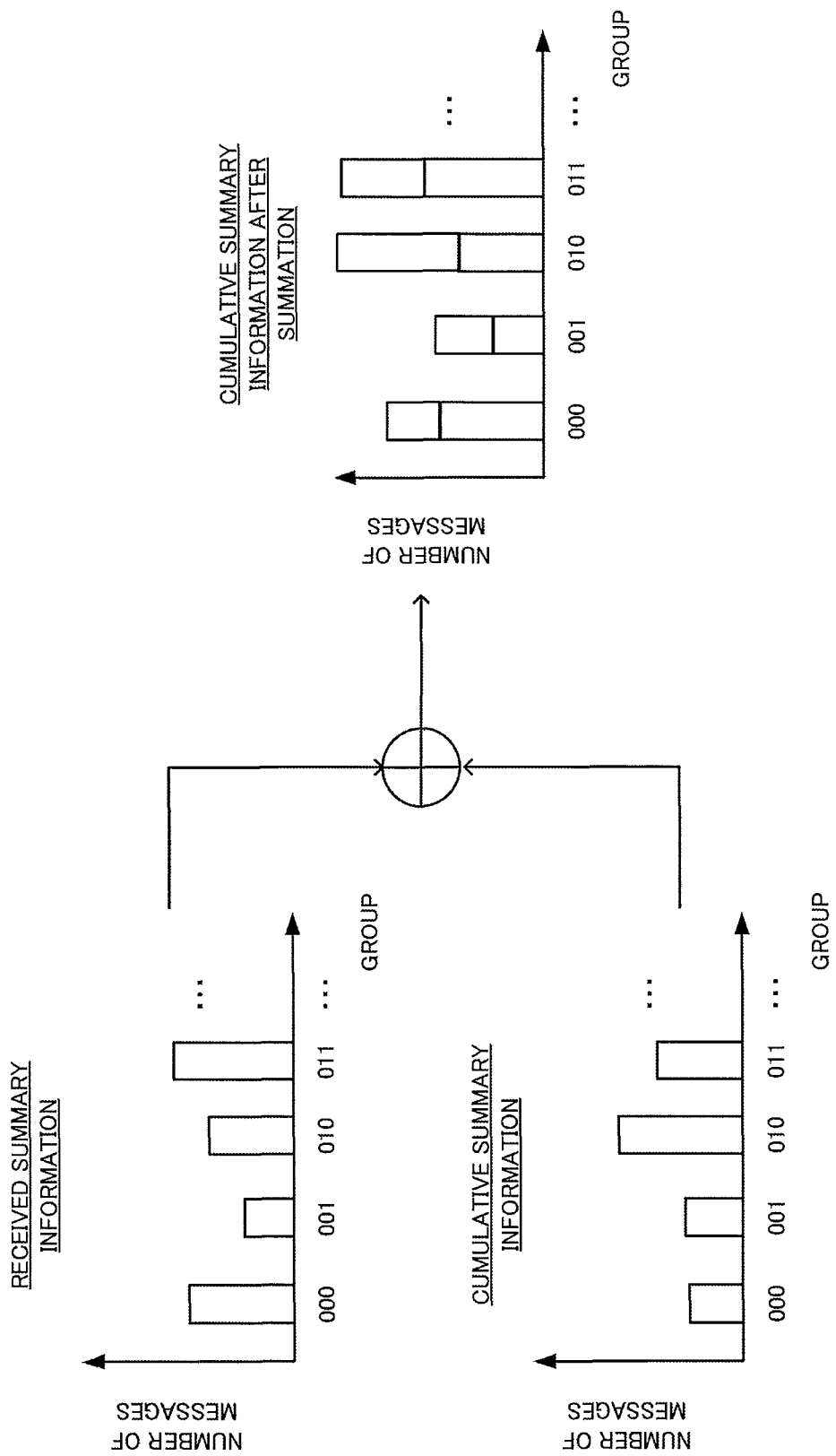

[Fig. 14]
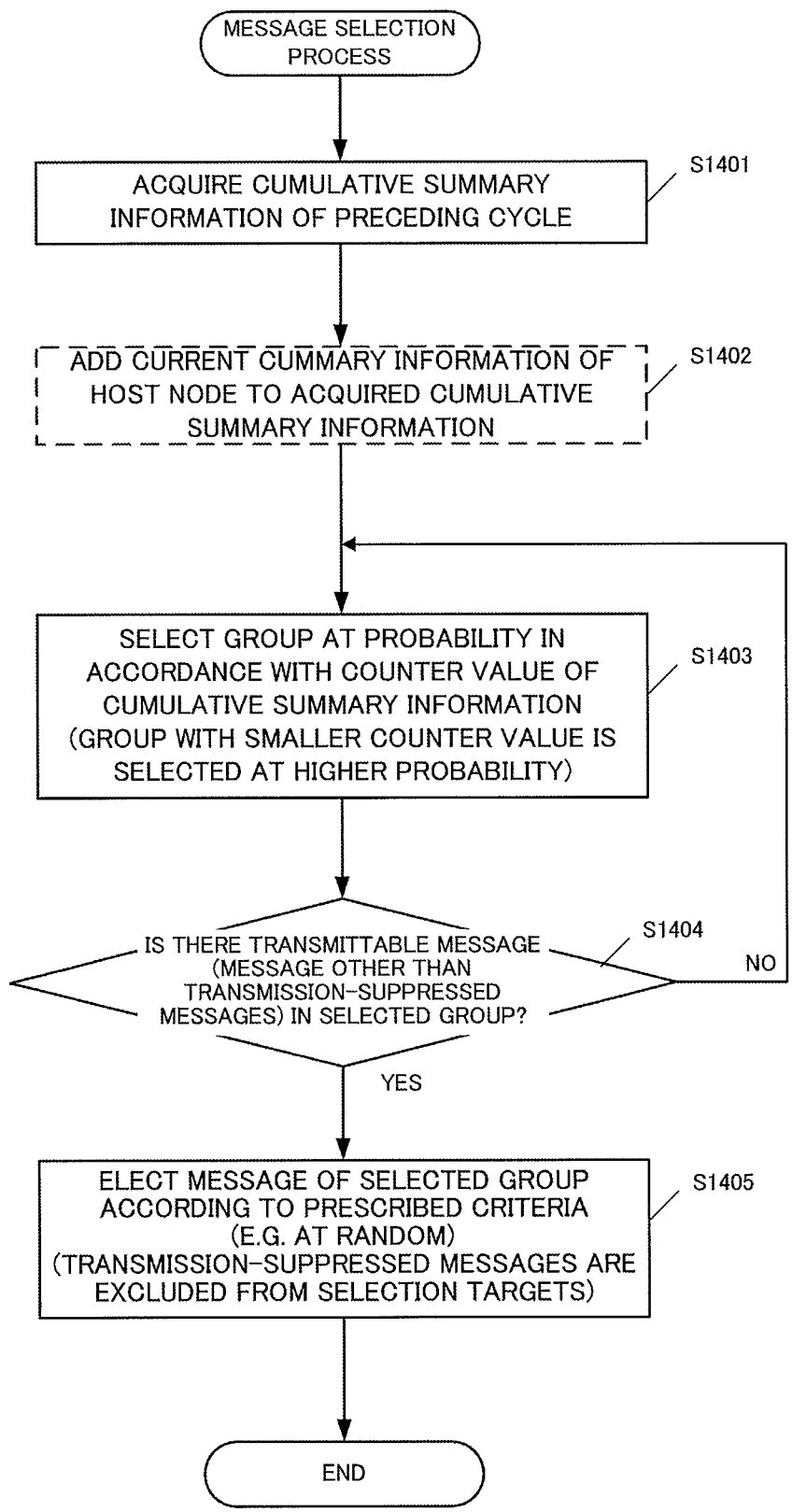

[Fig. 15]
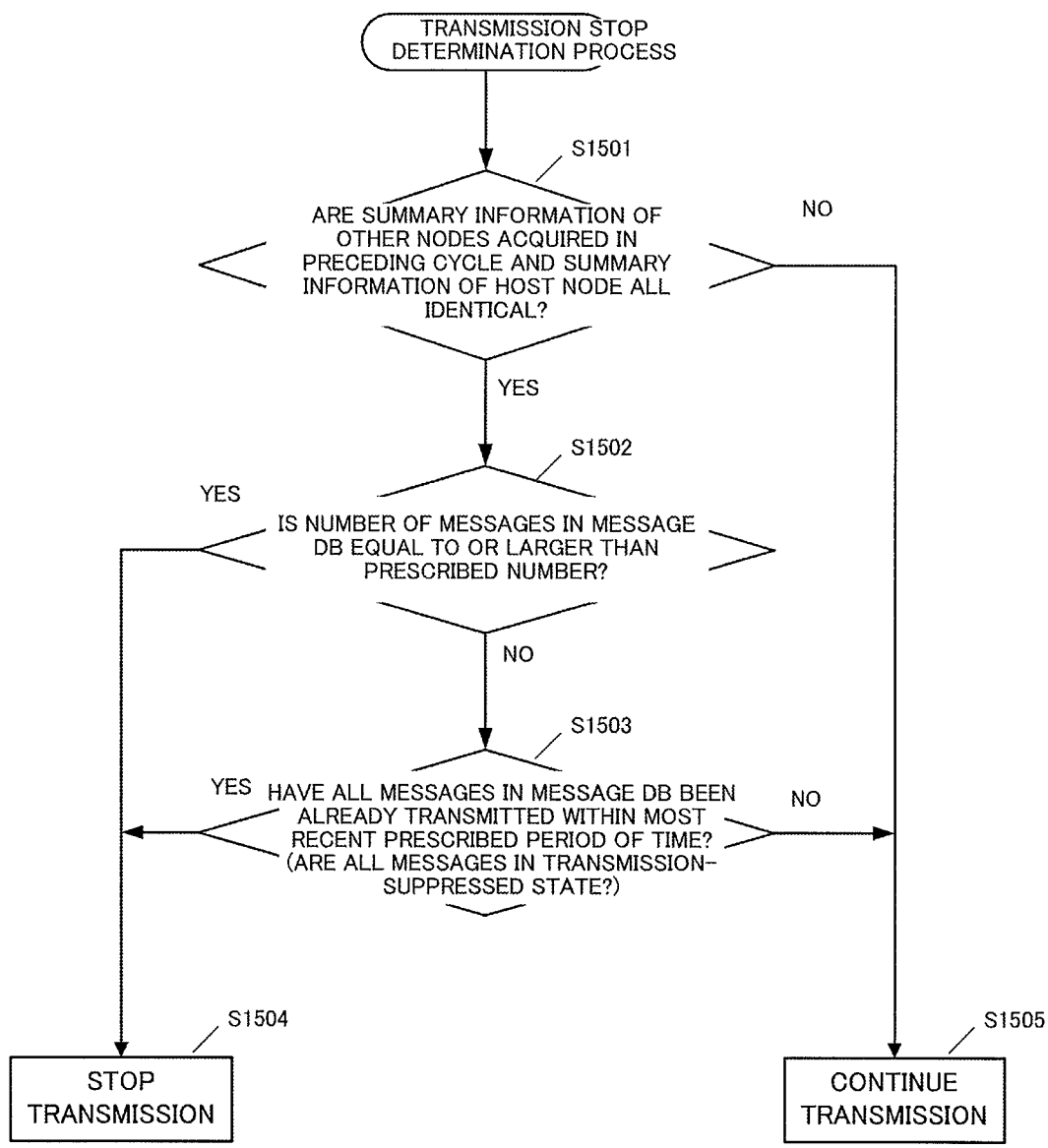

[Fig. 16A]

| | VEHICLE-MOUNTED DEVICE A (NODE A, AP) | VEHICLE-MOUNTED DEVICE B (NODE B, STA) | VEHICLE-MOUNTED DEVICE C (NODE C, STA) |
|---|---|---|---|
| CYCLE 1 | RANDOM SELECTION OF MESSAGE –> DA1<br><br>BROADCAST TRANSMISSION OF SA1 + DA1 | RECEIVE "SA1 + DA1"<br>INTEGRATE SA1 TO CUMULATIVE SUMMARY –>Ss1<br>REGISTER DA1 IN DB<br>AWAIT TRANSMISSION<br>RANDOM SELECTION OF MESSAGE –>DB1<br>BROADCAST TRANSMISSION OF SB1 + DB1 | RECEIVE "SA1 + DA1"<br>INTEGRATE SA1 TO CUMULATIVE SUMMARY –>Ss1<br>REGISTER DA1 IN DB<br>AWAIT TRANSMISSION |
| | RECEIVE "SB1 + DB1"<br><br>INTEGRATE SB1 TO CUMULATIVE SUMMARY –>Ss1<br><br>REGISTER DB1 IN DB<br><br>AWAIT PACKET FROM STA | AWAIT PACKET | RECEIVE "SB1 + DB1"<br>INTEGRATE SB1 TO CUMULATIVE SUMMARY –>Ss1<br>REGISTER DB1 IN DB<br>AWAIT TRANSMISSION<br>RANDOM SELECTION OF MESSAGE –>DC1<br>BROADCAST TRANSMISSION OF SC1 + DC1 |
| | RECEIVE "SC1 + DC1"<br>INTEGRATE SC1 TO CUMULATIVE SUMMARY –>Ss1<br>REGISTER DC1 IN DB<br><br>ALL STA TRANSMISSION COMPLETED –>GO TO NEXT CYCLE | RECEIVE "SC1 + DC1"<br>INTEGRATE SC1 TO CUMULATIVE SUMMARY –>Ss1<br>REGISTER DC1 IN DB | AWAIT PACKET |

TO CYCLE 2

[Fig. 16B]

| | VEHICLE-MOUNTED DEVICE A (NODE A, AP) | VEHICLE-MOUNTED DEVICE B (NODE B, STA) | VEHICLE-MOUNTED DEVICE C (NODE C, STA) |
|---|---|---|---|
| CYCLE 2 | COMPARISON OF SUMMARY INFORMATION SA1, SB1, AND SC1 -> NOT IDENTICAL = CONTINUE<br><br>SELECTION OF MESSAGE -> DA2 = (Ss1 + [SA2])<br>BROADCAST TRANSMISSION OF SA2 + DA2 | RECEIVE "SA2 + DA2"<br><br>INTEGRATE SA2 TO CUMULATIVE SUMMARY -> Ss2<br>REGISTER DA2 IN DB<br>AWAIT TRANSMISSION<br>SELECTION OF MESSAGE -> DB2 = (Ss1 + [SB2])<br>BROADCAST TRANSMISSION OF SB2 + DB2 | RECEIVE "SA2 + DA2"<br><br>INTEGRATE SA2 TO CUMULATIVE SUMMARY -> Ss2<br>REGISTER DA2 IN DB<br>AWAIT TRANSMISSION |
| | RECEIVE "SB2 + DB2"<br>INTEGRATE SB2 TO CUMULATIVE SUMMARY -> Ss2<br>REGISTER DB2 IN DB<br>AWAIT PACKET FROM STA | AWAIT PACKET | RECEIVE "SB2 + DB2"<br>INTEGRATE SB2 TO CUMULATIVE SUMMARY -> Ss2<br>REGISTER DB2 IN DB<br>AWAIT TRANSMISSION<br>SELECTION OF MESSAGE -> DC2 = (Ss1 + [SC2])<br>BROADCAST TRANSMISSION OF SC2 + DC2 |
| | RECEIVE "SC2 + DC2"<br>INTEGRATE SC2 TO CUMULATIVE SUMMARY -> Ss2<br>REGISTER DC2 IN DB<br><br>ALL STA TRANSMISSION COMPLETED -> GO TO NEXT CYCLE | RECEIVE "SC2 + DC2"<br><br>INTEGRATE SC2 TO CUMULATIVE SUMMARY -> Ss2<br><br>REGISTER DC2 IN DB | AWAIT PACKET |
| ⋮ | ~~~ REPEAT ~~~ | | |
| CYCLE N | COMPARISON OF SUMMARY INFORMATION SA(n-1), SB(n-1), AND SC(n-1) -> IDENTICAL = STOP TRANSMISSION | (SINCE THERE IS NO TRANSMISSION FROM AP, TRANSMISSION IS NOT PERFORMED) | (SINCE THERE IS NO TRANSMISSION FROM AP, TRANSMISSION IS NOT PERFORMED) |

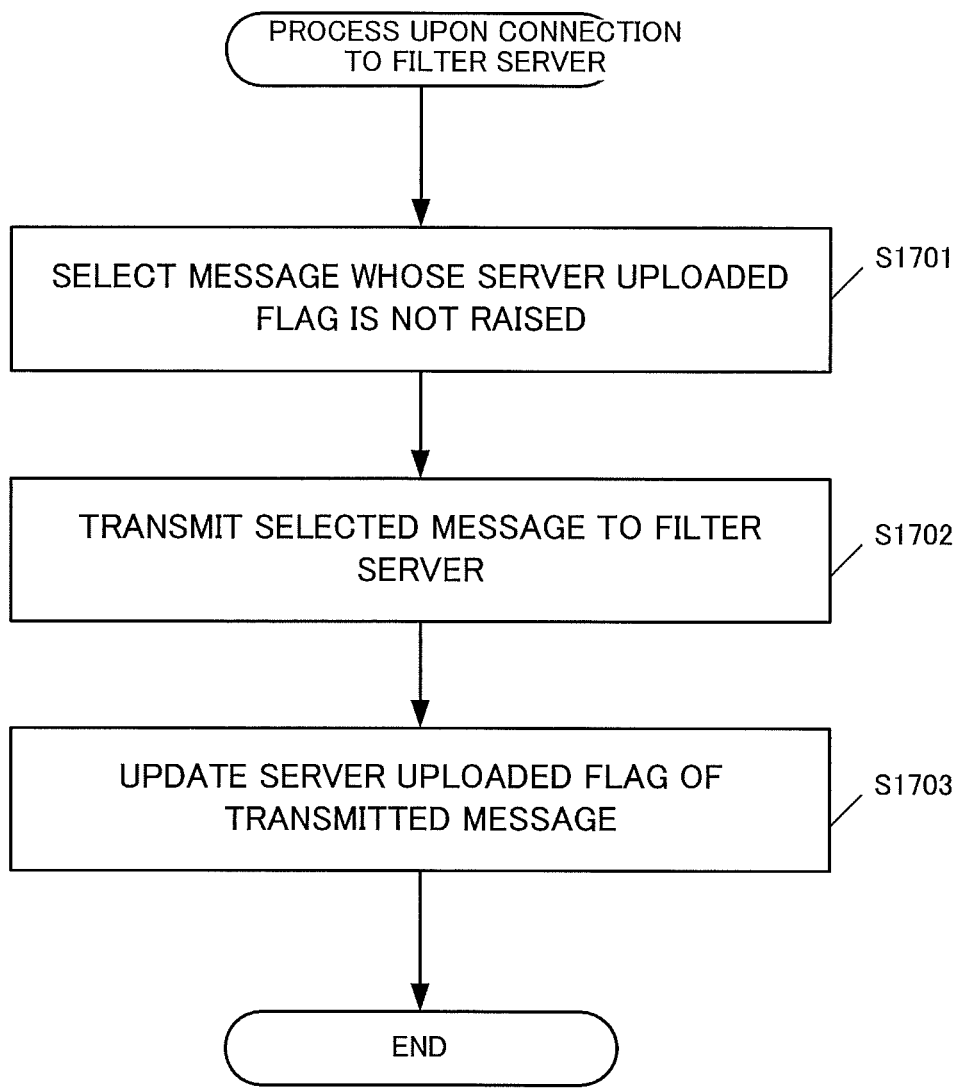

DATA TRANSMISSION DEVICE, DATA SHARING SYSTEM, DATA SHARING METHOD, AND MESSAGE EXCHANGING SYSTEM

TECHNICAL FIELD

The present invention relates to a technique for efficiently exchanging data among a plurality of communication nodes.

BACKGROUND ART

Systems for sharing information such as traffic information among a plurality of vehicles using vehicle-to-vehicle communication are being studied and developed. When information possessed by a vehicle is transmitted to surrounding vehicles, the surrounding vehicles store the received information and further transmit the information to its surrounding vehicles. Information spreads in this manner.

In information sharing technology including, but not limited to, vehicle-to-vehicle communication, there are demands for sharing information in an efficient manner. For example, it is desirable to transmit information that is not possessed by a communication partner. However, with the increase in storage capacity of information devices, the number of pieces of data possessed by one communication node becomes enormous. When the number of pieces of data is large, determining what kind of data is possessed and what kind of data is not possessed by a communication partner becomes difficult.

A Bloom Filter is a known technique for detecting identity of data (Non-Patent Document 1). A Bloom Filter calculates hash values of data and overlaps obtained hash values on each other using a bit-wise OR operation. When a hash value of data to be checked is calculated and the filter has a value of 0 at any bit position, it is guaranteed that the data is not registered. A Bloom Filter enables an inspection to be performed instantaneously (at O(1)).

Therefore, it is conceivable to utilize a Bloom Filter in information sharing technique to efficiently spread information. In other words, it is conceivable to acquire a filter value of a Bloom Filter from a communication partner node and, using the filter value, select and transmit data that is not possessed by the partner. However, a Bloom Filter is limited in that, once registered, data cannot be deleted. As the period of use becomes longer, a probability of occurrence of erroneous determinations (determinations of non-possessed data to be possessed data, i.e. false positive) gradually increases. Therefore, it is not effective to apply a Bloom Filter to a system which information is constantly supplied to and mush be discarded from.

CITATION LIST

Non Patent Literature

NPL 1: B. H. Bloom, "Space/time Trade-offs in Hash Coding with Allowable Errors", Communications of the ACM (CACM1970), vol. 13, No. 7, pp. 422-426, Jul. 1970.

SUMMARY OF INVENTION

Technical Problem

The present invention has been made in consideration of the problem described above, and the object thereof is to provide a data sharing technique that enables selection and transmission of information which a communication partner highly likely does not possess.

Solution to Problem

A first aspect of the present invention is a data transmission device that transmits data to another node. The data transmission device includes data storing means, summary information storing means, receiving means, selecting means, and transmitting means. The data storing means stores a plurality of pieces of data. The data transmission device selects any piece of data from the data stored in the data storing means and transmits the selected data to another node. The summary information storing means stores summary information that is created based on data stored in the data storing means. Summary information is information which classifies data stored in the data storing means into prescribed groups and which represents how many pieces of data are stored in the data storing means for each group. The receiving means receives summary information related to another node from the node. The selecting means selects data to be transmitted based on summary information received from the receiving means. The transmitting means transmits the data selected by the selecting means to the other node.

In the present aspect, the selecting means preferentially selects data included in a group with a smaller number of pieces of data in the summary information of the other node. When receiving summary information from a plurality of nodes, the numbers of pieces of data (counter values) for each group included in each piece of summary information may be summed and a determination similar to that described above may be performed based on the number of pieces of data after summation. For example, conceivably, based on the number of pieces of data for each group insofar as can be determined based on summary information, a group with a greater difference between a sum of the numbers of pieces of data of all groups and the number of pieces of data of the group may be preferentially selected and data belonging to the selected group may be selected. Any criteria may be adopted as criteria for selecting a message from the selected group. Such configuration enables selection and transmission of data which a communication partner does not possess with high probability. In this disclosure, preferential selection means selection with a high probability. In other words, when data of a group with a smaller number of pieces of data is to be preferentially selected, data of a group with a smallest number of pieces of data need not always be selected. However, a configuration may be adopted where data of a group with the smallest number of pieces of data is always selected.

In the present aspect, favorably, the selecting means does not consider data transmitted by the transmitting means within a most recent prescribed period of time as a target for the selection described above. Accordingly, wasteful redundant transmission of the same data within a short period of time can be eliminated.

The receiving means according to the present aspect favorably receives data from another node or user. In addition, favorably, the data transmission device according to the present aspect further includes data managing means which stores data received by the receiving means in the data storing means and which updates summary information. Summary information may be updated by obtaining, from received data, a group of the data and incrementing the number of pieces of data (counter value) with respect to the obtained group by 1. Alternatively, when a group ID is included in the received data, the number of pieces of data with respect to the group ID may be incremented by 1. Accordingly, summary information in the data transmission device can always be made consistent with the data storing means.

In the present aspect, favorably, the transmitting means transmits summary information stored in the summary information storing means of its host node (hereinafter, also referred to as summary information of the host node) to another node. Accordingly, data not possessed by the host node can be expected to be transmitted from another node.

In the present aspect, the selecting means may be configured to select data to be transmitted based not only on summary information transmitted from another node but also on summary information of its host node. Specifically, data of a group with a smaller number of pieces of data can conceivably be preferentially selected by summing summary information of another node and summary information of the host node. Other methods are also conceivable as a selection method that takes summary information of the host node into consideration. For example, summary information of another node and summary information of the host node may be compared with one another, whereby data included in a group with a smaller number of pieces of data possessed by the other node as compared to the number of pieces of data possessed by the host node may be preferentially selected. When there are a plurality of communication partner nodes, an average number of pieces of data possessed by one other node and the number of pieces of data possessed by the host node may be compared with each other, whereby data belonging to a group with a greater difference may be preferentially selected.

A group to which data belongs may conceivably be decided based on a hash value of the data. In other words, the data managing means according to the present aspect may conceivably handle a hash value obtained by applying a hash function to data as a group of the data. In this case, a hash function with high uniformity (such as CRC, MD, and SHA) may conceivably be adopted as the hash function. Alternatively, a special hash function with a high possibility of similar data assuming a same hash value (such as LSH, GeoHash, and GeoHex) may conceivably be adopted. It should be noted that either all of the pieces of data or a part of the pieces of data may be applied to a hash function. For example, since using LSH causes a same hash value (group) to be assigned to similar data, only a part to be a determination target of similarity is favorably applied to a hash function. In a similar manner, GeoHash and GeoHex target a part related to position information among data. While using a uniform hash function enables identity to be determined, using a special hash function such as those described above enables selection and transmission of data while taking similarity into consideration in addition to identity. Alternatively, when only identity is to be considered, a group may be decided by a random number instead of using a hash function. A similar effect to a case where a uniform hash function is used can be produced when using a random number. In addition, also favorably, a group decided at this point is stored in association with data and transmitted to another node together with the data. Accordingly, a group need no longer be decided at each node.

In the present aspect, favorably, when storing data received by the receiving means in the data storing means, the data managing means deletes data from the data storing means when enough space in the capacity of the data storing means is unavailable. In doing so, the data managing means also updates summary information. Specifically, a process is performed where the number of pieces of data (counter value) of the group from which data had been deleted is decremented by 1. In addition, even if there is available space in the capacity of the data storing means, when the number of pieces of data in the summary information storing means becomes equal to or greater than a prescribed number (upper limit value), a message belonging to a same group as the received data is favorably deleted from the data storing means. In other words, data is also favorably deleted from the data storing means, when an overflow of the counter value of summary information occurs. In the data transmission device according to the present aspect, since a count number of each group is used as summary information, consistency of summary information can be maintained even if data is deleted from the data storing means.

With the data transmission device according to the present aspect, data not possessed by another node is transmitted. Therefore, it is expected that data possessed by all nodes is to ultimately become the same if communication is enabled over a long period of time. Subsequently, since data transmission need no longer be performed once possessed data becomes identical, transmission of data is stopped. As an example of a specific stopping condition, conceivably, a condition may be adopted which requires the number of pieces of data of respective groups being consistent with respect to all pieces of summary information including summary information of another node and summary information of the host node. This is because when such a condition is satisfied, it is highly possible that data possessed by all nodes is consistent. While this stopping condition acts as an effective determination criterion when the number of pieces of data possessed by each node is sufficiently large, the stopping condition may not necessary indicate that possessed data is consistent when the number of pieces of possessed data is small. In consideration thereof, also favorably, when the number of pieces of data stored in the data storing means is smaller than a prescribed threshold, a condition that the data stored in the data storing means has been transmitted at least once within a most recent prescribed period of time is added to the stopping condition.

A second aspect of the present invention is a data sharing system constituted by the data transmission device according to the first aspect. Due to the data transmission device having the functions described above, data stored in any of nodes (data transmission devices) in the data sharing system is efficiently transmitted to other nodes and promptly spreads within the system. Therefore, data possessed by each node becomes consistent to one another in a relatively short period of time. It should be noted that the data transmission device in the data sharing system according to the present aspect may be configured as a mobile communication device. While data possessed by all nodes cannot necessarily be made consistent when a movement speed of a data transmission device is high, data not possessed by other nodes can be preferentially transmitted. In this case, a mobile communication device includes a communication device which is mounted to a mobile object such as a mobile vehicle, a communication device which is carried by a person on the move, and a communication device which is carried onboard a mobile object such as a vehicle which moves.

In the second aspect of the present invention, favorably, each node (data transmission device) constituting the data sharing system is capable of functioning as both an access point (AP) and a station (STA). Alternatively, favorably, at least any of the nodes is capable of functioning as both an access point and a station. In addition, in the system, one node functions as an access point and other nodes function as a station. In this case, favorably, the node that functions as an access point has a function of assigning an address to a node that functions as a station. Favorably, transmitting means of the node that functions as a station starts transmitting after a time in accordance with an address assigned to its host node has elapsed after transmission by the node functioning as an access point. Accordingly, even in a case where each node adopts a random access communication system, communication according to a time division system can be realized in the data sharing system. Since conflicts in communication and unnecessary waiting times do not occur in time division communication, communication can be performed in an efficient manner.

Once a time division communication system such as that described above is realized, cycles (periods) can now be introduced into communication. In other words, a period from transmission by the node functioning as an access point to completion of transmission by all other nodes can be defined as one communication cycle. In addition, favorably, selecting means of each node selects data to be transmitted based on summary information received from another node in a communication cycle immediately preceding a current communication cycle. The introduction of communication cycles clarifies time points of summary information to be used.

A third aspect of the present invention is a data sharing method performed by the data transmission device according to the first and second aspects.

A fourth aspect of the present invention is a message exchanging system that is realized using the data sharing techniques according to the first to third aspects. The message exchanging system according to the present aspect is constituted by a plurality of user terminals and a plurality of data communication devices, and exchanges a message input at a user terminal among the plurality of data communication devices and provides the message to the other user terminals.

A user terminal according to the present aspect includes inputting means for accepting input of a message by a user, transmitting means for transmitting a message to a data communication device, and output means for receiving a message from the data communication device and outputting the message to the user.

The data communication device according to the present aspect is similar to the data transmission device according to the first aspect described earlier. In addition, the plurality of data communication devices according to the present aspect function as the data sharing system according to the second aspect described earlier.

By adopting such a configuration, a message input by a user via a user terminal is efficiently exchanged within the system and reaches other user terminals in a relatively short period of time.

In the present aspect, favorably, the plurality of data communication devices are capable of functioning both as access points and as station and the data communication device that functions as an access point communicates with the user terminals. The data communication devices are capable of functioning as access points with respect to both other data communication devices and user terminals by virtualizing access points or by including a plurality of radios.

In the present aspect, favorably, the data communication devices are configured to be capable of communicating with a server device via a prescribed network such as the Internet. Favorably, when the data communication device that functions as a station becomes capable of connecting to the prescribed network, the data communication device connects to the network and transmits a message to the server device. Since a message spreads efficiently in the system as described above, by adopting a configuration where a message input at a user terminal is transmitted to the server device when any of the data communication devices discovers a connection to the server device, the possibility of the message being transmitted to the server device can be increased.

In this case, favorably, when the data communication device functioning as a station becomes capable of connecting to the prescribed network, the data communication device periodically switches between connection to the network and connection to the data communication device functioning as an access point. Accordingly, even when the data communication device has only one radio, both message exchanges within the system and message transmission to the server device can be performed.

In the present aspect, favorably, the server device described above has a function of uploading a message transmitted from a data communication device to a message posting server. The message posting server has a function of accepting posting of a message and displaying the posted message to an accessing user. In doing so, favorably, the server device described above has a function of determining whether the posted message is a message already uploaded by the host device to the message posting server and a function of uploading a message that has not yet been uploaded to the message posting server. Accordingly, a same message can be prevented from being redundantly posted to the message posting server.

The present invention can be considered to be a data transmission device, a data sharing system, and a message exchanging system including at least a part of the means described above. In addition, the present invention can also be considered to be a data transmission method including at least a part of the processes described above. The respective means and processes described above can be combined with one another in any way possible to constitute the present invention.

Advantageous Effects of Invention

According to the present invention, information having a high possibility of not being possessed by a communication partner can be selected and transmitted and information can be shared in an efficient manner.

BRIEF DESCRIPTION OF DRAWINGS

FIG. 1 A diagram showing an overall configuration of an entire information sharing system 100 according to a present embodiment.

FIG. 2 A diagram showing an example of a screen that is displayed when a user terminal 102 accesses a vehicle-mounted device 110.

FIG. 3 A diagram showing a functional configuration of the vehicle-mounted device 110.

FIG. 4 A diagram showing a state transition of communication modes of the vehicle-mounted device 110.

FIG. 5 A flowchart showing a flow of processes that are executed when the vehicle-mounted device 110 communicates with the user terminal 102.

FIG. 6 A diagram showing a format of message information.

FIG. 7 A diagram showing an outline of summary information;

FIG. 8 A flow chart showing a flow of processes performed by the vehicle-mounted device 110 when a message is posted to the vehicle-mounted device 110 from a user 103.

FIG. 9 A diagram explaining communication order control when communication is performed among vehicle-mounted devices 110.

FIG. 10 A flowchart showing an outline of a communication process performed among vehicle-mounted devices 110.

FIG. 11 A flowchart showing a flow of processes performed by the vehicle-mounted device 110 when a message is received from another vehicle-mounted device.

FIG. 12 A flowchart showing a flow of processes performed by the vehicle-mounted device 110 when summary information is received from another vehicle-mounted device.

FIG. 13 A diagram explaining accumulation (summation) of summary information.

FIG. 14 A flowchart showing a flow of processes when selecting message information transmitted by the vehicle-mounted device 110.

FIG. 15 A flowchart showing a flow of a determination process of stopping transmission of message information at the vehicle-mounted device 110.

FIG. 16A A diagram explaining a specific operation example of a message exchange process among vehicle-mounted devices 110.

FIG. 16B A diagram explaining a specific operation example of a message exchange process among vehicle-mounted devices 110.

FIG. 17 A flowchart showing a flow of processes when the vehicle-mounted device 110 communicates with a filter server 105.

DESCRIPTION OF EMBODIMENTS

An information sharing system according to the present embodiment provides a disaster response environment whose main purpose is to provide information service by propagating information among vehicles upon occurrence of a disaster and transmitting information from a vehicle to a user. Information provided by a vehicle to a user includes information input by a user in addition to information possessed in advance such as a map of a surrounding area and a disaster response manual. An object of the information sharing system according to the present embodiment is to efficiently exchange and spread, among vehicles, information posted by a user to a vehicle and to deliver the information to many users or to a server on the Internet. Hereinafter, the information sharing system according to an embodiment of the present invention will be described with reference to the drawings.

<Outline of Entire System>

FIG. 1 is a diagram showing an overall configuration of an entire information sharing system 100 according to the present embodiment. As shown in FIG. 1, the information sharing system is constituted by a plurality of vehicles 101a, 101b, and 101c (hereinafter, also referred to as a vehicle 101 either collectively or individually), a plurality of user terminals 102a and 102b (hereinafter, also referred to as a user terminal 102 either collectively or individually), a network 104, a filter server 105, and a message posting server 106. It should be noted that the configuration shown is simply an example and the vehicle 101, the user terminal 102, and the filter server 105 may be provided in any number. In addition, any number of user terminals may be connected to one vehicle.

The vehicle 101 includes a wireless communication device (vehicle-mounted device) 110 and exchanges information with other vehicles, provides information to a user 103, and transmits information to the filter server 105. For example, the vehicle 101 stores a message input by the user 103 either directly or via the user terminal 102 in a database and exchanges the message with other vehicles. Since vehicles are movable, the message input by the user is widely propagated. When an operating access point is found, the vehicle 101 transmits the message input by the user to the filter server 105 via a network 104. Since the message spreads among the vehicles in an efficient manner, even if most of the communication infrastructure is shut down by a disaster, the message is transmitted to the filter server 105 by any of the vehicles. The filter server 105 has a function of filtering (selecting) messages to be posted to the message posting server 106 and transmits messages other than those already transmitted to the server 106.

The user terminal 102 is a mobile wireless communication device (such as a notebook personal computer and a smart phone) provided with a wireless communication function and a web service client function. The user terminal 102 can acquire information from the vehicle 101 and transmit information to the vehicle 101.

While the network 104 may be any network, the Internet is assumed in the present embodiment. The filter server 105 has a function of filtering messages to be transmitted from the vehicle 101 to the message posting server 106. In the present embodiment, instead of directly posting a message to the message posting server 106, the vehicle 101 first transmits the message to the filter server 105. In other words, since messages are collected at the filter server 105, the filter server 105 can manage which message has been posted to the message posting server 106. The filter server 105 selects messages that are not yet posted to the message posting server 106 and transmits the messages to the message posting server 106. A user can view the messages posted to the message posting server 106 via the Internet. An Internet connection is highly disaster-resistant with the exception of the last one mile, and as long as a user can secure an access point, the user can read messages posted to the message posting server 106 without restriction.

Envisioned usage of the information sharing system according to the present embodiment will now be described from the perspective of the user 103. FIGS. 2(a) and 2(b) are diagrams showing examples of a screen displayed on the user terminal 102. FIG. 2(a) represents an example of a screen that is displayed when the user terminal 102 wirelessly connects to the wireless communication device 110 of the vehicle 101. As shown in FIG. 2(a), the user 103 can download via the user terminal 102 a map of the surrounding area or a disaster response manual, read official announcements made by the government or news media, write in a message board system, and search in message boards. When using a message board, a message may be written or a message possessed by the vehicle 101 may be searched on a screen such as that shown in FIG. 2(b). A message written in a message board system by a user is exchanged and propagated among the vehicles 101. Therefore, the user 103 can search for and display a message written by another user to another vehicle from the vehicle 101 to which the user 103 is connected. In this case, messages that can be searched by the user are limited to those possessed by the vehicle 101.

In order to allow the user 103 to acquire various messages from the vehicle 101 or to allow the vehicle 101 to discover Internet connections (which are scarce) and upload a message to a server, messages must be efficiently propagated and spread among the vehicles 101. Hereinafter, a description will be given in greater detail with a focus on a method of exchanging (sharing) messages mainly among the vehicles 101.

<Configuration of Device>

FIG. 3 is a diagram showing a functional configuration of the vehicle-mounted device 110 mounted to the vehicle 101. The vehicle-mounted device 110 is a computer equipped with a wireless communication device. Various functional units such as those shown in FIG. 3 are realized by having a CPU read and execute a program stored in a tangible, non-transitory storage medium such as an HDD, a SDD, and a ROM. In other words, by having the CPU execute a computer program, the vehicle-mounted device 110 functions as a communication managing unit 210, a message managing unit 230, and a message storing unit 250. The communication managing unit 210 is a functional unit that provides a function for performing wireless communication with the user terminal 102, other vehicle-mounted devices 110, and the filter server 105. The message managing unit 230 is a functional unit that provides a function for managing messages stored in the vehicle-mounted device 110. Specifically, the message managing unit 230 registers and updates message information, updates summary information, selects transmission messages, and the like. The message storing unit 250 is a functional unit for storing various types of data.

In addition to those shown in FIG. 3, the vehicle-mounted device 110 has peripheral devices including a positional information acquisition device such as a GPS device, a velocity sensor, an acceleration sensor, an illuminance sensor, a gyro sensor, a microphone, and a camera and is configured to be capable of using information acquired by such peripheral devices. In addition, also favorably, the vehicle-mounted device 110 is equipped with functions other than those described above such as a car navigation function. Furthermore, also favorably, the vehicle-mounted device 110 includes an input device such as a touch panel, buttons, and a keyboard which accepts input by a user and an output device such as a display device and a speaker which provides information to the user. The vehicle-mounted device 110 may directly accept instructions by the user 103 via the input device and accept postings of messages or search and display messages without involving the user terminal 102.

In the present embodiment, it is assumed that the vehicle-mounted device 110 includes one wireless communicating means conforming to the Wi-Fi Direct standard. The vehicle-mounted device 110 has two communication modes: an AP mode and a STA mode. In the AP mode (Wi-Fi Direct AP mode), a connection can be made to any STA (in this case, the user terminal 102 and other vehicle-mounted devices 110 in the STA mode). In the STA mode, a connection can be made to other vehicle-mounted devices in the AP mode or to the Internet. A state transition between communication modes and the like will be described in detail later. When the vehicle-mounted device 110 includes a plurality of wireless communicating means, a plurality of connections may be made at the same time instead of switching connections as described above.

The communication functional unit 210 is a functional unit for managing communication with other devices. The vehicle-mounted device 110 communicates with the user terminal 102, other vehicle-mounted devices 110, and the filter server 105. To this end, the communication managing unit 210 includes a user terminal data communicating unit 211, a vehicle-to-vehicle data communicating unit 212, and a filter server data communicating unit 213. The user terminal data communicating unit 211 is a functional unit for performing communication with the user terminal 102, and the user terminal data communicating unit 211 can be implemented as a web server which, when a connection is made by a user, transmits data for displaying web pages and which performs processes in accordance with an input by the user. The vehicle-to-vehicle data communicating unit 212 is a functional unit for performing communication with other vehicle-mounted devices 110 and favorably, but not necessarily, accommodates DTN (Delay Tolerant Networking). In this case, DTN refers to a known networking scheme for coping with environments that do not provide stable communication such as extremely long communication delay times, frequent packet losses, and emergence of intermittent communication links. The filter server data communicating unit 213 is a functional unit for transmitting messages to the filter server 105.

The message managing unit 230 is a storage unit for managing messages and other data stored in the message storing unit 250. The message managing unit 230 is mainly constituted by a message adding unit 231 and a message selecting unit 232. The message adding unit 231 stores messages input (received) from the user terminal 102 and messages received from other vehicle-mounted devices 110 in the message storing unit 250. The messages are, as will be described later, stored in the message storing unit 250 with various types of additional information added to it, and the message adding unit 231 undertakes this task of setting the additional information. In addition, since the present embodiment adopts summary information that is information representing what kind of messages are stored in the message storing unit 250, the message adding unit 231 updates summary information in addition to adding (registering) messages. Upon occurrence of a situation such as data capacity having reached an upper limit when adding a message to the storing unit 250, the message adding unit 231 adds the new message after deleting any of existing messages.

The message selecting unit 232 selects a message to be transmitted to the other vehicle-mounted devices 110. Specifically, a message that is assumed not to be possessed by the vehicle-mounted device 110 of a communication partner is favorably transmitted. To this end, in the present embodiment, summary information is acquired from the vehicle-mounted device 110 of the communication partner and the message to be transmitted is selected by referring to the information. Details will be provided later.

The message storing unit 250 is a functional unit for storing various types of data. A message database 251 stores messages received from user terminals or other vehicle-mounted devices 110. A summary information database 252 stores summary information. A disaster response information database 253 stores static data such as map information of surrounding areas and a disaster response manual.

The user terminal 102 may be any device as long as the device is capable of communicating with the vehicle-mounted device 110. In the present embodiment, a notebook personal computer, a smartphone, and the like equipped with a wireless communication capability is assumed. The user terminal 102 accesses the vehicle-mounted device 110 via, for example, a browser application or other communication applications to post messages and acquire various types of information. Since existing devices can be adopted as the user terminal 102, a detailed description will be omitted.

It is also favorable to configure the user terminal 102 to be capable of posting a signed message to the vehicle-mounted device 110. For example, a digital signature of a user is stored in advance in the user terminal 102, the digital signature is added to a message from an authenticated user, and the message is posted to the vehicle-mounted device 110. By adding a signature, it is expected that message tampering and spoofing can be prevented and accurate information can be transmitted in a chaotic state that is created when a disaster strikes. Although any user may use a signature, it is assumed that signatures are to be added to messages posted by the government, municipalities, and news media.

The filter server 105 is constituted by one or a plurality of computers. The filter server 105 has a function of managing messages transmitted from the vehicle-mounted device 110, and when acquiring a message not yet transmitted to the message posting server 106, transmitting the message to the message posting server 106. Since a method for realizing such a function can be readily understood by a person skilled in the art, a detailed description will be omitted.

<Contents of Processes>

Hereinafter, contents of processes performed in the present system will be described in greater detail with reference to the drawings.

1. Switching Between Communication Modes of Vehicle-mounted Device

FIG. 4 is a diagram showing a state transition of communication modes of the vehicle-mounted device 110. When the system of the vehicle-mounted device 110 is started up and the vehicle-mounted device 110 enters an initial state 401, the vehicle-mounted device 110 emits a beacon to announce the presence of its host node and, at the same time, acquires beacons from surrounding devices to detect what kind of devices are present nearby (402). At this point, the communication managing unit 210 arbitrates whether to enter the AP mode or the STA mode of Wi-Fi Direct in accordance with states of the vehicle-mounted devices 110 that are present nearby. For example, when another Wi-Fi Direct device cannot be detected within a prescribed period of time (for example, 20 seconds), a transition is made to the Wi-Fi Direct AP mode (404). In the Wi-Fi Direct AP mode 404, connections from other vehicle-mounted devices 110 as well as a connection from the user terminal 102 are accepted. While the vehicle-mounted device 110 in the Wi-Fi Direct AP mode 404 basically does not change communication modes, when a certain period of time (for example, 30 seconds) has elapsed after connected vehicle-mounted devices disappear, the vehicle-mounted device 110 makes a transition to a detecting state 402. In a case where a vehicle-mounted device 110 in the Wi-Fi Direct AP mode is present nearby or the like in the detecting state 402, a transition is made to the Wi-Fi Direct STA mode (405). When a vehicle-mounted device in the AP mode is lost during the Wi-Fi Direct STA mode 405, the vehicle-mounted device 110 returns to the state 402 and detects a state of its surroundings. In addition, an Internet connection is periodically searched in the Wi-Fi Direct STA mode 405, and when an Internet connection is found, the vehicle-mounted device 110 makes a transition to a state 406 and transmits a message to the filter server 105. Once the communication with the filter server 105 is performed for a prescribed period of time (for example, 3 minutes), the vehicle-mounted device 110 returns to the Wi-Fi Direct STA mode 405. In other words, the vehicle-mounted device 110 in the Wi-Fi Direct STA mode 405 periodically switches between a connection to a vehicle-mounted device in the AP mode and a connection to the Internet (filter server). Even before the prescribed period of time described above elapses in the state 406 of communication with the filter server 105, once all possessed messages have been transmitted to the filter server 105, a transition is made to the Wi-Fi Direct STA mode 405.

In the present embodiment, data such as messages is exchanged within the system via wireless communication in various modes performed by the vehicle-mounted devices 110.

When the vehicle-mounted device 110 includes a plurality of communicating means, all of or a part of connections to other vehicle-mounted devices, a connection to the user terminal, and a connection to the Internet may be performed simultaneously. Even in such a case, for the purpose of conserving battery consumption, only one communicating means may be enabled and connections may be switched as described above.

2. Communication with User Terminal

FIG. 5 is a flow chart showing a flow of processes when the vehicle-mounted device 110 communicates with the user terminal 102. When the vehicle-mounted device 110 is in the Wi-Fi Direct AP mode (the state 404 in FIG. 4), the vehicle-mounted device 110 accepts a connection from the user terminal 102.

When a connection is made from the user terminal 102, the user terminal data communicating unit 211 transmits data for displaying a menu such as that shown in FIG. 2(*a*) on the user terminal 102 (S501). Subsequently, when a selection of a menu item is transmitted from the user (S502), a process in accordance with the selected content is executed.

When a process of posting a message is selected by the user, data for displaying a message posting screen (FIG. 2(*b*)) is transmitted to the user terminal and a posted message is received from the user terminal 102 (S503). Subsequently, the message adding unit 231 stores the received message in the message DB 251 (S504). Details of the process of adding a message will be provided later. When the connection with the user terminal 102 is continued (yes in S509), the menu is displayed once again, and if the connection with the user terminal 102 is not continued (no in S509), the process is ended.

When a process of searching for a message is selected by the user, data for displaying a message searching screen (FIG. 2(*b*)) is transmitted to the user terminal and a search condition is received from the user terminal 102 (S505). As the search condition, any condition can be adopted such as a condition that a prescribed word or phrase is included in a message body and a condition that a message has been posted on a prescribed date/time or at a prescribed location. The message selecting unit 232 searches for a message satisfying an input search condition in the message DB 251 (S506). The user terminal data communicating unit 211 transmits a message that is the search result to the user terminal and causes the user terminal to display the message (S507). It should be noted that a search condition need not necessarily be input and (all of or a part of) a list of messages possessed by the vehicle-mounted device 110 may be displayed instead. As described above, a message may be provided to the user as long as the message is stored in the message DB 251 of the vehicle-mounted device 110.

When a process of acquiring disaster information is selected by the user, which information is to be acquired among information stored in the disaster response information DB 253 is acquired from the user terminal 102 and the requested information is transmitted to the user terminal 102 (S508).

When a signed message is to be transmitted to the user terminal, also favorably, a name of a transmission source is acquired from a signature and the name of the transmission source is transmitted to and displayed by the user terminal together with contents of a message. As the name of a transmission source, a name included in a digital signature may be used or a correspondence between an identifier of a digital signature and a name of a transmission source may be stored in advance and a name corresponding to the identifier of the digital signature may be used.

3. Format of Message Information

FIG. 6 is a diagram showing a format of message information stored in the message DB 251.

An initial registration date/time 601 is a field representing a date and time of registration of a message by the user 103 to the vehicle-mounted device 110 either via the user terminal 102 or directly. A message in the present system basically circulates only after the user 103 posts the message to any of the vehicle-mounted devices 110, and the date/time of an initial posting of the message is stored in this field.

An initial registration position 602 is a field representing a location of registration of a message by the user 103 to the vehicle-mounted device 110 either via the user terminal 102 or directly. In a similar manner to the initial registration date/time 601, a location where a message is posted by the user 103 to any of the vehicle-mounted devices 110 is stored in this field.

A message body 603 is text information representing contents of a message. An upper limit number of characters in the message body is set to, for example, 140 characters. By setting an upper limit to a length of a message in this manner, a large storage capacity can be prevented from being consumed by a single message.

An initial registration user ID 604 is an ID of the user 103 having registered a message. For example, a user ID input by the user 103 may be adopted or a device ID, a MAC address, or the like of the user terminal 102 may be adopted. By making the user 103 having posted a message identifiable, a message posted by a specific user can be readily retrieved.

An initial registration node ID 605 is a device ID or a MAC address of the vehicle-mounted device 110 having received a message from the user 103. By adopting this field, the vehicle-mounted device 110 can determine which message has been directly received by its host node from the user 103. This field is adopted taking into account the effectiveness of a policy of not deleting (retaining) messages directly received from a user as much as possible.

A signature 606 is a field for storing a digital signature corresponding to a message. For example, by adding a digital signature to information announced by public organizations such as the government, municipalities, and news media, message tampering and spoofing can be prevented and reliability of message contents can be guaranteed. In addition, since a message poster can be determined based on a signature, for example, the signature 606 field is effective when selecting only messages bearing the signature of a specific municipality and providing the user 103 with a list display of the message.

A server upload flag 607 is a field indicating whether or not the message has already been transmitted to the filter server 105. This field is updated upon transmission of the message by the vehicle-mounted device 110 to the filter server 105.

A hop count 608 is a field indicating how many times the message has been transmitted among the vehicle-mounted devices. This field is updated when the vehicle-mounted device 110 transmits or receives a message by vehicle-to-vehicle communication. The field is effective as a reference when selecting a transmission message, whereby a determination can be made that the larger a hop count of a message, the wider the spread of the information in the message. In addition, the field can be used to stop further transmission of a message or delete the message from the message DB 251 if the hop count is greater than a threshold. When a message is received from the user 103, the hop count 608 is set to zero.

A group ID 609 is a field indicating an identifier of a group to which the message belongs. As will be described later, in the present embodiment, a hash value obtained by applying a hash function to a message is adopted as a group ID of the message. By storing a once-obtained group ID in message information, the trouble of recalculating the group ID can be eliminated. The group ID is referred to when the message selecting unit 222 selects a transmission message.

An initial registration flag 610 is a field indicating whether or not the message has been directly registered by the user 103 to the host node. This field is adopted taking into account the effectiveness of a policy of not deleting (retaining) messages directly received from a user as much as possible.

A previous transmission time 611 is a field indicating a time of communication of a message when the message is received from another vehicle-mounted device 110. This field is used to suppress transmission where, for example, a message transmitted within a most recent prescribed period of time is prevented from being transmitted once again.

It should be noted that all of the fields described above need not necessarily be adopted. In the present embodiment, the fields labeled optional in FIG. 6 can be omitted. However, favorably, essential fields and optional fields are adopted as appropriate in accordance with system requirements. Therefore, any of the fields shown in FIG. 6 may not be adopted or other fields may be adopted.

In addition, data related to the fields described above in message information may be generated by the vehicle-mounted device 110 instead of receiving the data from the user (user terminal 102). In other words, the vehicle-mounted device 110 may be configured to receive only a part of the message information from the user and the rest of the information may be added by the message adding unit 231. While the message body 603 and the signature 606 must be received from the user, the other information can be generated by the vehicle-mounted device 110. For example, a date/time and a location of reception of a message from the user by the vehicle-mounted device 110 may be adopted as the initial registration date/time 601 and the initial registration position 602. It should also be obvious that the other fields can be generated by the vehicle-mounted device 110.

Details of a process of registering a message received from the user terminal 102 to the message DB 251 will be provided in "5. Message registration process".

4. Contents and Method of Generating Summary Information

In the present system, transmitting messages that are not possessed by a partner among the vehicle-mounted devices 110 as much as possible is effective from the perspective of increasing efficiency of propagation and spreading of messages. However, determining what kinds of messages are possessed by a partner becomes difficult particularly when the amount of retained messages increases. For example, in the present embodiment, assuming that a capacity of one piece of message information is around several hundreds of bytes and a storage capacity of the message DB is several tens of gigabytes, the number of messages that can be stored is several tens of millions. For example, if all of the residents of Tokyo prefecture (13 million people) are to respectively post an average of five messages, this storage capacity is sufficient to store all of the messages in one vehicle-mounted device. When possessing such a large number of messages, it is difficult to accurately determine what kinds of messages are possessed by a partner in a short period of time.

In consideration thereof, in the present embodiment, a group ID is assigned to each message, and summary information representing how many messages are stored in the message DB 251 for each group ID is adopted. In other words, summary information is a set of values of a counter that counts the number of messages of each group. Summary information will now be described with reference to FIG. 7.

When posting of a new message is accepted from the user terminal 102, the message adding unit 231 stores the message in the message DB 251 and, at the same time, updates the summary information DB 252. Specifically, a group ID of the message is obtained and a counter value of the group ID in summary information is incremented by 1.

A method of calculating a group ID will now be described in detail. In the present embodiment, the message adding unit 231 has a hash function and a hash value obtained by applying the hash function to a message is adopted as a group ID of the message. As the hash function, a hash function with high uniformity (such as CRC, MD, and SHA) may conceivably be adopted. Since the number of messages for each group ID (hash value) is to be counted, the number of bits of a hash value need not be large. In the present embodiment, an 8-bit hash value is adopted. Therefore, 256 groups are to be created.

For example, a capacity (number of bits) of each counter may be set to 26 bits or more to ensure that an overflow does not occur even if all storable messages (several tens of millions: see description given earlier) belong to one group or to around 16 bits to ensure that an overflow does not occur when the messages are evenly distributed among the respective groups (several tens of millions divided by 256 groups). In the present embodiment, counters are assumed to be 16 bits.

The effectiveness of summary information in propagating messages will be briefly described. When there are a sufficiently large number of messages, it is assumed that the number of messages for each group ID is approximately the same. Therefore, by referring to summary information of a given vehicle-mounted device, a determination can be made that it is highly possible that a message of a group with a small number of messages is not possessed. Accordingly, when summary information of a communication partner is acquired, by transmitting a message of a group with a smaller number of messages (counter value), the possibility of transmitting a message that is not possessed by a partner increases. In addition, a similar effect can be produced by referring to summary information of both transmitting and receiving nodes and transmitting a message of a group for which a counter value of the receiving node is smaller than a counter value of the transmitting node. In any case, using summary information enables a message with a high possibility of not being possessed by a vehicle-mounted device of a communication partner to be preferentially transmitted.

How a transmission message is to be transmitted using summary information when summary information is received from a plurality of communication partners will be described in detail in the section titled "6-4. Transmission message selection process". In addition, using summary information enables a determination to be made on whether or not messages possessed by the host node and a communication partner node are consistent. Details of this process will be described in the section titled "6-6. Transmission stop determination process".

Which part of the fields included in message information is to be applied to a hash function to obtain a group ID may be selected as appropriate. For example, a hash function may be only applied to the message body 603 or a hash function may be applied to an entire piece of message information. Obviously, a hash function may also be applied to a plurality of or parts of the fields of message information.

While a uniform hash function is adopted in the description provided above, other hash functions may also be favorably adopted. For example, conceivably, a special hash function with a high possibility of a same hash value (group ID) being assigned to similar data may be adopted.

LSH (Local Sensitivity Hash) is an example of such a special hash function. Using LSH increases the probability that the same hash value is to be assigned to similar data (bit strings). Adopting LSH enables messages with similar contents to be consolidated into one group. Therefore, by selecting a message of a group for which a counter value of a partner node is small as described earlier, the probability of transmitting a message which is not possessed by the partner and which has a low similarity with possessed messages increases and efficient message exchange can be realized. When using LSH, a part whose similarity is to be determined must be applied to a hash function. For example, when focusing on a similarity of a message body, (only) the message body 630 is favorably applied to a hash function. In addition to the message body 630, the initial registration date/time 601, the initial registration location 602, the initial registration user ID 604, and the like may conceivably be set as a target for similarity determination.

In addition, other examples of a special hash function include GeoHash and GeoHex. With these hash functions, there is a high probability of hash values of two proximal positions being consistent with respect to an input of position information. Therefore, these hash function can be preferably used when adopting position information as a reference for similarity determination.

In addition, a method of assigning random number values instead of using a hash function is also conceivable as a method of calculating a group ID of a message. Even when random number values are used, the number of messages included in each group is approximately the same when there are a large number of messages. Therefore, a similar effect to a case described earlier where the uniform hash function is adopted can be produced. When a random number value is adopted as a group ID, the random number value must be stored in the group ID 609 in message information. This is because, in this case, other nodes cannot calculate the group ID based on message information. Nevertheless, even when calculating a group ID using a hash function, it is favorable to store a group ID in message information since doing so relieves other nodes from the hassle of once again performing a hash calculation.

5. Message Registration Process

A process of registering a message when the vehicle-mounted device 110 receives the message will be described. While the vehicle-mounted device 110 may receive a message from the user 103 (either directly or via the user terminal 102) or from another vehicle-mounted device, since processes performed in both cases are similar, a description of an example of a case where a message is received from the user 103 will be described.

FIG. 8 is a flow chart showing a flow of a message registration process by the vehicle-mounted device 110 in a case where a message is posted from the user 103 (the user terminal 102) to the vehicle-mounted device 110.

When a message is received from the user 103, the message adding unit 231 applies a hash function to the message and calculates a group ID (hash value) (S801). In the present embodiment, a group ID is calculated by applying CRC-16 to a message body.

Once the group ID of the received message is calculated, confirmation is made on whether a counter of the group in summary information has reached an upper limit (S802) and whether the number of stored messages in the message DB 251 has reached an upper limit (S803). When neither upper limit has been reached (no in S802 and no in S803), the process proceeds to step S804.

In step S804, various fields constituting message information are generated or updated by the message adding unit 231. Specifically, a current time is assigned to the initial registration date/time 601. A current position (latitude/longitude information) as obtained from a GPS device is assigned to the initial registration position 602. A MAC address of the user terminal 102 having posted the message is assigned to the initial registration user ID 604. A vehicle-mounted device ID of the vehicle-mounted device 110 (host node) is assigned to the initial registration node ID 605. When a signature has been added to the message, the signature is assigned to the signature 606, while if not, the signature 606 is left blank. The server upload flag 607 is set to zero (indicating that upload has not yet been performed). The hop count 608 is set to zero. The group ID calculated in step S801 is assigned to the group ID 609. The initial registration flag 610 is set to 1 (indicating an initial registration). The previous transmission time 611 may be left blank or the current time may be assigned thereto. Generation of message information may be performed prior to calculation of a group ID (S801). In particular, when calculating a group ID based on something other than a message body, the message information is favorably created prior to calculating the group ID.

The message adding unit 231 stores the generated message information in the message DB 251 (S805) and, at the same time, updates summary information (S806). To update the summary information, a counter value corresponding to the group ID calculated in step S801 is incremented by 1.

If it is determined, in step S802, that the counter of the group described above in summary information has reached the upper limit (yes in S802), the process proceeds to step S807 and the message managing unit 230 selects and deletes a message belonging to the group from the message DB 251. While any selection criteria may be adopted for the message to be deleted, the present embodiment adopts the following criteria. Specifically, messages directly received by the host node from the user (messages for which the initial registration flag 610 is raised) are not considered as targets to be deleted, and messages are randomly selected from those with old initial registration dates/times, those with high hop counts, and those with raised server upload flags. After deleting the message from the message DB 251, a counter value of the group in summary information is decremented by 1 (S809) and a registration process of step S804 and thereafter is performed. Since the summary information update processes of steps S809 and S806 are redundant in the flow of the processes, both steps can be omitted.

If it is determined, in step S803, that the number of messages stored in the message DB 251 has reached the upper limit (yes in S803), the process proceeds to step S808 and the message managing unit 230 selects and deletes a message from the message DB 251. This deleting process only differs from the deleting process in step S807 in that messages of any group may be an target to be deleted. The summary information is updated in a similar manner to that described above after deleting the message (S809) and the registration process of step S804 and thereafter is performed.

6. Communication Among Vehicle-mounted Devices

Next, communication among vehicle-mounted devices 110 will be described. While a process of exchanging a message will be mainly described hereinafter, communication is to be performed using a similar method when transmitting other data.

(6.1 Communication Order)

Each vehicle-mounted device periodically performs broadcast communication in accordance with a communication standard such as IEEE 802.11a/b/g/n/i/ai. Each vehicle-mounted device broadcasts summary information and message information possessed by its host node within a communication period assigned to the host node. While contents of data to be communicated will be described later, timings when respective nodes perform communication (communication order control) will now be described with reference to FIG. 9.

As described earlier, inter-vehicle communication according to the present embodiment is realized using Wi-Fi Direct, in which one vehicle-mounted device functions as an AP and other vehicle-mounted devices operate in an STA mode. The vehicle-mounted device 110 that functions as an AP (hereinafter, also simply referred to as an AP) is also equipped with a DHCP function and assigns IP addresses to vehicle-mounted devices 110 that connect as an STA (hereinafter, also simply referred to as an STA). In the present embodiment, a range from 192.168.10.2 to 192.168.10.254 is assigned to STAs. It is assumed that 192.168.10.1 is statically assigned to the AP.

In this case, an order in accordance with IP addresses is adopted as an order in which communication is to be performed. Specifically, after the AP starts communication, each STA starts communication after standing by for a time corresponding to a value of the IP address assigned to its host node after the subnet mask (in this case, 255.255.255.0). For example, when a transmission interval of the respective nodes is 100 milliseconds, the vehicle-mounted device to which 192.168.10.2 is assigned starts communication after 100 milliseconds elapses from the transmission by the AP (192.168.10.1). In this case, the host node of each vehicle-mounted device starts communication upon the lapse of (value of IP address after subnet mask−1)×100 milliseconds after the start of communication by the AP. Since the AP is aware of the number of STAs connected to its host node, the AP starts a next communication upon completion of communication by all STAs.

By performing transmission order control based on IP addresses in this manner, conflicts between transmission packets can be avoided and efficient communication can be realized, and a concept of "cycles" can be introduced into communication. Therefore, each vehicle-mounted device controls communication based on such cycles. A communication control process performed by each vehicle-mounted device will now be briefly described with reference to FIG. 10. First, when a message is received from the AP (S1001), each vehicle-mounted device stands by for a time corresponding to a value of the IP address after the subnet mask (S1002). After the standby time elapses, message information to be transmitted is selected (S1003), and the selected message information and summary information of the host node is broadcasted to the surrounding area (S1004). In this case, in the message information selection process in step S1003, the selection is performed based on summary information received from surrounding vehicle-mounted devices in an immediately preceding cycle. Details will be provided later.

While a transmission timing is determined based on IP addresses in the description given above, IP addresses need not necessarily be used. For example, the AP may be configured to explicitly notify an STA as to which timing communication is to be started. Although this makes the process more complicated, the method is effective in a case where an arbitrary address cannot be assigned by the DHCP function or the like.

(6-2. Process Upon Reception of Message)

Next, a process when receiving message information from another vehicle-mounted device will be described with reference to FIG. 11. In the present embodiment, while a scenario where message information and summary information are collectively received from another vehicle-mounted device is assumed, for the sake of brevity, a process upon receiving message information will be described first, and a process upon receiving summary information will be subsequently described.

When message information is received from another vehicle-mounted device, the message managing unit 230 determines whether or not the same message information exists in the message DB 251 (S1101). Identity of message information can be determined based on, for example, whether or not message information whose initial registration date/time 601 and initial registration user ID 604 are identical to those of the received message information is stored in the message DB 251. Obviously, identity may be determined by also taking other fields into consideration.

When an identical message to the received message does not exist in the DB 251 (no in S1101), a registration process of the message is performed (S1105). Since the message registration process is a process similar to the process when receiving a message from the user terminal 102 (refer to "5. Message registration process" and the flow chart shown in FIG. 8), a detailed description will be omitted. A difference from a case where a message is received from the user terminal 102 is that since information is stored in the various fields (refer to FIG. 6) when receiving message information from the vehicle-mounted device 110, information need not be created at the vehicle-mounted device 110. However, the receiving vehicle-mounted device 110 needs to update the hop count 608, the initial registration flag 610, and the previous transmission time (if values thereof have not been updated by the transmitting party).

On the other hand, when a message identical to the received message exists in the DB 251 (yes in S1101), the message need not be registered in the DB 251. However, when the server upload flag 607 is raised in the received message information but the flag is not raised in the message information in the DB 251, the flag in the message information in the DB 251 is raised (S1102). In addition, when the hop count of the received message information is larger than the hop count of the message information in the DB 251 (yes in S1013), the hop count of the message information in the DB 251 is overwritten by the hop count of the received message (S1104).

Since broadcasting (UDP) is used to communicate among vehicles in the present embodiment, reception cannot be confirmed and an occurrence of a packet loss cannot be detected. In consideration thereof, a vehicle-mounted device having received message information (the same applies to summary information) from another vehicle-mounted device 110 may transmit the received message. Having each vehicle-mounted device transmit the same message, message information can be more reliably propagated among the vehicle-mounted devices. Here, it is favorable that transmitters of a received message are limited to, for example, vehicle-mounted devices having received message information directly from the vehicle-mounted device of the transmission source or vehicle-mounted devices within a prescribed number of hops. In addition, instead of having all receiving vehicle-mounted devices transmit the received message, the received message may be transmitted only by several of the nodes. Which nodes are to transmit the received message may be decided according to prescribed criteria or may be stochastically decided using a random number or the like. Accordingly, communication efficiency can be improved and packet loss can be suppressed.

(6-3. Process Upon Reception of Summary information)

Summary information received from another vehicle-mounted device 110 is used to select a transmission message. This is because referring to summary information enables a determination to be made on which message has a high possibility of not being possessed by the vehicle-mounted device of a communication partner. In the present embodiment, received summary information is totaled in cycle units. When selecting a message, a selection process is executed based on summary information received and totaled in a preceding cycle. Hereinafter, a process performed when summary information is received from another vehicle-mounted device 110 will be described with reference to FIGS. 12 and 13.

When summary information is received from another vehicle-mounted device 110, whether or not a change is made to a new communication cycle is determined (S1201). In the present embodiment, since a communication cycle is started from the vehicle-mounted device functioning as an AP, an STA can determine that a new communication cycle is entered upon receiving summary information from the AP. In the case of the AP, a determination that a communication cycle has ended and a new communication cycle has started can be made when all connected STAs complete communication.

When a change has been made to a new communication cycle (yes in S1201), the message managing unit 230 stores cumulative summary information that is currently stored in a memory as cumulative summary information for a preceding cycle in the summary information DB 252 (S1202). Subsequently, the cumulative summary information is reset (S1203). While cumulative summary information is also information representing how many messages exist in each group in a similar manner to ordinary summary information, cumulative summary information differs from ordinary summary information in that summary information of a plurality of vehicle-mounted devices are aggregated. In step S1203, a counter of each group in the cumulative summary information is reset to zero. Subsequently, the message managing unit 230 adds the received summary information to the cumulative summary information (S1204). The received summary information is also stored in the memory by itself.

On the other hand, when the communication cycle is continuing (no in S1201), the received summary information is added to cumulative information without resetting the cumulative summary information (S1204).

In a summation process of summary information, as shown in FIG. 13, a counter value of the group of the received summary information is added to a counter value of cumulative summary information of the respective groups. In FIG. 13, a top left diagram represents received summary information, a bottom left diagram represents cumulative summary information, and a right diagram represents the cumulative summary information after summation. Due to such a process, summary information of the currently communicating vehicle-mounted devices 110 (with the exception of the host node) is totaled in the cumulative summary information.

(6-4. Transmission Message Selection Process)

Next, details of the process of selecting message information to be transmitted at a transmission timing by the vehicle-mounted device 110 (step S1003 in FIG. 10) will be described with reference to the flow chart shown in FIG. 14.

Upon arrival of a transmission timing, the message selecting unit 232 acquires cumulative summary information of a preceding cycle (S1401). In addition, current summary information of the host node is added to the acquired cumulative summary information (S1402). Accordingly, cumulative summary information that is a sum of summary information of all surrounding vehicle-mounted devices and the host node is obtained. Since step S1402 is an omissible step, step S1402 is depicted by a dotted line in FIG. 14.

Next, the message selecting unit 232 selects a group (group ID) based on the cumulative summary information (S1403). Specifically, the smaller a counter value of a group, the higher the probability of selection of the group. In the present embodiment, a group with a group ID of i is drawn according to a selection probability $P_i$ given below.

$$P_i = \frac{N - n_i}{N(m-1)}, \qquad \text{[Math 1]}$$

where $n_i$ denotes a counter value of group ID=i in the cumulative summary information, N denotes a total counter value of all groups in the cumulative summary information, and m denotes the number of groups.

While a group is arranged to be selected at a ratio in accordance with a difference between the total counter value N of all groups in the cumulative summary information and the counter value $n_i$ of the target group, i.e., $(N-n_i)$, alternatively, other methods can be adopted. For example, a group may be arranged to be selected at a ratio in accordance with a difference between an average counter value N/m and the counter value $n_i$ of the target group, i.e., $(N/m-n_i)$. In addition to the above, as a method in which a group with a smaller counter value is selected with high probability, a group may conceivably be selected at a ratio in accordance with an inverse of a counter value. However, since using an inverse causes a difference in ratios to become prominent when counter values are small and become hardly noticeable when counter values are large, a probability based on a difference is adopted in the present embodiment.

When a group is selected, the message selecting unit 232 checks whether there is a transmittable message in the selected group (S1404). In the present embodiment, not to be transmitted is message information transmitted within a most recent prescribed period of time (transmission is suppressed). In other words, when the date and time stored in the previous transmission time 611 is within a prescribed period of time from the current time, the message information is decided not to be transmitted. In step S1404, a determination is made on whether or not message information in which the previous transmission time 611 indicates a time preceding the prescribed period of time described above exists in the selected group.

When transmittable message information does not exist in the selected group does not exist (no in S1404), the process returns to step S1403 to re-select another group. In doing so, favorably, a once-selected group is arranged not to be selected.

When transmittable message information does not exist in the selected group exists (yes in S1404), the message selecting unit 232 selects message information according to prescribed criteria from message information that can be transmitted. As the prescribed criteria, for example, criteria can be adopted which is based on at least any of the initial registration date/time 601, the initial registration position 602, the hop count 608, the server upload flag 607, the signature 606, the initial registration flag 610, and the previous transmission time 611. With respect to the initial registration date/time 601, newer information may be preferentially selected, older information may be preferentially selected, or information with a value in a prescribed range may be preferentially selected. This also applies to fields other than the initial registration date/time. Alternatively, the message selecting unit 232 may randomly select a message from the selected group. In the present embodiment, a message is randomly selected from messages whose hop count 608 is equal to or under a prescribed threshold and whose previous transmission time 611 is not within a most recent prescribed period of time.

While a description in which only one piece of message information is to be selected has been given with respect to the flow chart shown in FIG. 14, when the vehicle-mounted device 110 transmits a plurality of pieces of message information, a plurality of pieces of message information must be selected. There are two methods of selecting a plurality of messages: a method of selecting a plurality of messages from the group selected in step S1403; and a method of selecting a plurality of messages by repeating the processes of steps S1403 to S1405. The selection method may be decided as appropriate in accordance with system requirements.

In addition, since cumulative summary information of a preceding cycle cannot be used in a first communication cycle, the message selecting unit 232 may randomly select messages from message information possessed by its host node.

(6-5. Transmission Process)

Next, details of the transmission process (step S1004 in FIG. 10) of the vehicle-mounted device 110 will be described. The vehicle-to-vehicle data communicating unit 212 of the vehicle-mounted device 110 broadcasts message information selected by the message selecting unit 232 and summary information stored in the summary information DB 252 to its surroundings.

When transmitting the message information, while all fields (refer to FIG. 6) of the message information may be transmitted, a part of the fields need not be transmitted. For example, since the initial registration flag 610, the previous transmission time 611, and the group ID 609 can also be obtained by the receiving vehicle-mounted device, these fields need not be transmitted. In addition, when transmitting the message information, it is also favorable to transmit the message information after updating values of the fields at the transmitter. For example, the hop count 608 and the previous transmission time 611 may be transmitted after being updated by the transmitting vehicle-mounted device.

In the present embodiment, since broadcast transmission using UDP is performed, even when a packet loss occurs, the packet loss cannot be detected. In consideration thereof, in order to improve reliability of communication, it is also favorable to transmit the same message information a plurality of times. While the repetitive transmission is assumed to be performed within one cycle, a plurality of transmissions may be performed while straddling cycles. Since there is a tradeoff between the number of retransmissions and data transmission speed, repetitive transmission may be set as appropriate in consideration of necessary reliability with respect to communication environment and system requirements. For example, transmission may conceivably be repeated around two to four times. While UDP is used in the present embodiment, data may be transmitted while confirming reception thereof using TCP. While an overhead occurs and throughput is reduced with TCP, communication with high reliability can be realized.

(6-6. Transmission Stop Determination Process)

When transmission of message information as described above continues in a stable manner, it is expected that message information possessed by all nodes ultimately becomes identical. After the message information possessed by all nodes becomes identical, since there is no need to continue exchanging messages, a process of determining stopping message exchange is necessary. Since a new communication cycle starts when the vehicle-mounted device 110 functioning as an AP transmits a message, the transmission stop determination process should be performed by the message managing unit 230 of the vehicle-mounted device 110 functioning as the AP.

FIG. 15 is a flow chart showing a flow of the transmission stop determination process. Upon the start of a transmission period of its host node, the message managing unit 230 determines whether or not the pieces of summary information of other nodes acquired in a preceding cycle and the summary information of its host node are all identical (S1501). The pieces of summary information being all identical means that counter values of the respective groups are identical in the pieces of summary information of all nodes. When the summary information is not identical (no in S1501), since message information possessed by the respective nodes differs, transmission is continued (S1505).

On the other hand, when the summary information is identical (yes in S1501), it is highly possible that message information possessed by each node is identical. However, since a determination based on summary information is probabilistic, identical summary information does not necessarily guarantee that possessed message information is identical. For example, a situation may occur in which, even if a counter value of a given group is "2" in all nodes, one node may possess pieces of message information of A and B and another node may possess pieces of message information of C and D. This manifests itself as a prominent problem particularly when the number of messages stored in the message DB 251 is small. This is because message inconsistency becomes prominent in the case of small number of pieces of messages compared to the case of larger number of pieces of messages in which case most of the messages are supposed to be identical.

In consideration thereof, in the present embodiment, when summary information is identical, transmission is stopped when the number of messages in the message DB 251 is equal to or larger than a prescribed threshold (S1504), but when the number of messages in the message DB 251 is smaller than the prescribed threshold (no in S1502), a condition of stopping transmission further includes all of the messages in the message DB 251 being already transmitted within a most recent prescribed period of time (yes in S1503). In other words, that all messages being subjected to transmission suppression is adopted as a condition of stopping transmission. By transmitting all of the messages in the message DB 251, possessed messages of each node becomes identical. While transmitting all possessed messages may require considerable communication time, since transmission of all possessed messages is only performed when the number of possessed messages is small, such problems do not occur. While the prescribed threshold for the determination described above may be arbitrarily determined in accordance with system requirements, the prescribed threshold is set to 10,000 in the present embodiment. It should be noted that the threshold need not necessarily be a fixed value and, for example, a value in accordance with the number of currently communicating vehicle-mounted devices (for example, fixed value/number of vehicle-mounted devices) may be adopted.

When a determination to stop transmission is made, communication (for exchanging messages) among the vehicle-mounted devices 110 is stopped. As a restart condition, a case where a new message is posted by the user 103 to any of the vehicle-mounted devices 110 or a case where a new vehicle-mounted device 110 connects to the AP are conceivable. These vehicle-mounted devices 110 transmit summary information to the AP. Accordingly, since a disparity of summary information is detected at the other vehicle-mounted devices, message exchange is restarted. At this point, the vehicle-mounted device functioning as the AP may restart from a process of assigning IP addresses and establish a new communication cycle or may perform communication by continuing an existing communication cycle without modification.

(6-7. Operation Example of Message Exchange Among Vehicle-Mounted Devices)

Message information is exchanged among vehicle-mounted devices according to the method described above. An overall flow of communication among vehicle-mounted devices will now be described with reference to FIGS. 16A and 16B. These diagrams show a flow in a case where message information is exchanged among three vehicle-mounted devices (nodes A, B, and C). In the drawings, DAi denotes data (message information) transmitted by the node A in an i-th cycle. SAi denotes summary information of the node A in the i-th cycle. Ssi denotes cumulative summary information in the i-th cycle.

Here, it is assumed that a group has been coordinated under Wi-Fi Direct so that it has been decided that the node A is to function as an AP and the nodes B and C are to function as STAs. It is also assumed that a communication order of the respective nodes in one cycle has been decided to be an order of nodes A, B, and C. The process shown in FIG. 16A represents a process subsequent to these decisions.

First, data transmission is performed starting at the node A. The data to be transmitted includes a randomly selected message DA1 and summary information SA1 as of the current time. The message to be transmitted is randomly selected because this communication cycle is an initial cycle and summary information could not be acquired from surrounding nodes prior to this communication cycle. Information broadcasted from the node A is received by the nodes B and C. After transmission by its host node, the node A awaits reception of packets from all connected STAs.

The nodes B and C receive the message DA1 and the summary information SA1 transmitted from the node A. In addition, the nodes B and C integrate (add) the received summary information to the cumulative summary information Ss1. Since the cumulative summary information Ss1 is empty at the start of a new communication cycle, the cumulative summary information Ss1 after integration is equivalent to the summary information SA1 transmitted from the node A. Furthermore, the nodes B and C store the received message information DA1 in the message DB 251 and, at the same time, update summary information. The nodes B and C stand by until transmission timings of their host nodes arrive.

After receiving communication from the AP, a node functioning as an STA starts transmission after standing by for a period of time in accordance with a transmission order of its host node. For example, assuming that the IP addresses of the nodes A, B, and C are respectively 192.168.10.1, 192.168.10.2, and 192.168.10.3, an address value after a subnet mask is the transmission order. In this case, since the node B is second in the transmission order, the node B starts transmission following the node A. When the transmission timing of the node B arrives, the node B broadcasts a randomly selected message DB1 and summary information SB1 as of the current time.

Since processes at the nodes A and C upon receiving the communication from the node B are similar to the nodes B and C upon receiving the communication from the node A described above, a description will be omitted.

Next, the node C obtains transmission rights and starts transmission. Since this process is similar to that described above, a description will be omitted.

Since the node A has received communication from all connecting STAs (nodes B and C), the node A is able to comprehend that a first cycle has ended and starts a second cycle. FIG. 16B shows processes of the second and subsequent cycles.

The node A first determines whether or not summary information SA1, SB1, and SC1 of the respective nodes in the preceding cycle are identical. In this case, since the message information possessed by the respective nodes is not identical, communication is continued.

In the second cycle, the communication order is the same as that of the first cycle or, in other words, in the order of nodes A, B, and C. The node A selects message information from the DB 251 and transmits the message information. In doing so, the message to be transmitted is selected based on cumulative summary information Ss1+SA2 obtained by adding summary information SA2 of the host node at the current time to the cumulative summary information Ss1 (in this case, SB1+SC1) totaled in the first cycle. As selection criteria, message information of a group with a smaller counter value in the cumulative summary information Ss1+SA2 is preferentially selected (selected with a high probability). The node A broadcasts the selected message DA2 and the summary information SA2 of its host node to its surroundings.

Processes of the receiving nodes B and C are the same as those in the first cycle. In other words, the received summary information SA2 is integrated with cumulative summary information Ss2 reset at the start of the cycle. In addition, the received message DA2 is stored in the DB 251 and, at the same time, summary information of host nodes is updated.

Hereinafter, even in the second cycle, transmission rights are obtained in an order of the nodes B and C and processes of selection and transmission of a transmission message are performed. Since basic processes are the same as those described earlier, a description will be omitted.

Repeating such cycles eventually causes all of the pieces of summary information SA(n−1), SB (n−1), and SC (n−1) of the respective nodes in the preceding cycle to be identical at the node A. In this case, the node A does not transmit message information. Since transmission is not performed by the node A, the nodes B and C also stop transmission. As a stopping condition of message exchange, in addition to a simple condition that summary information is identical, a condition that the number of possessed messages is equal to or larger than a prescribed number may also be favorably added. In other words, even when all of the pieces of summary information are identical, when the number of possessed messages is smaller than the prescribed number, message exchange may be continued until possessed messages are all transmitted (until all messages enter a transmission suppressed state).

7. Upload Process from Vehicle-mounted Device to Filter Server

When the vehicle-mounted device 110 discovers a network connection in the state 405 of performing vehicle-to-vehicle communication as an STA or in the connection detecting state 402, the vehicle-mounted device 110 communicates as an STA with the filter server 105 via the network 104. In the communication with the filter server 105, the vehicle-mounted device 110 uploads message information stored in the message DB 251. Hereinafter, details of this process will be described with reference to the flow chart in FIG. 17.

Once connection with the filter server 105 is established, the message selecting unit 232 selects message information in which the server upload flag 607 is not raised from the message DB 251 (S1701). In doing so, while message information in which the server upload flag is not raised may be randomly selected, for example, selection and transmission may also be favorably performed in accordance with criteria such as preferentially transmitting information with a small hop count.

The filter server data communicating unit 213 transmits the selected message information to the filter server 105 (S1702). In addition, with respect to the transmitted message, the message managing unit 230 updates the server upload flag 607 to 1 (S1703).

The vehicle-mounted device 110 continuously performs this process until all pieces of stored message information are uploaded. When a vehicle-mounted device having performed vehicle-to-vehicle communication performs communication with the filter server 105, it is also favorable to periodically switch between communication with the filter server 105 and vehicle-to-vehicle communication.

While a process of transmitting message information from the vehicle-mounted device 110 to the filter server 105 has been described above, alternatively, the vehicle-mounted device 110 may be configured to receive message information from the filter server 105. A process upon receiving message information from the filter server 105 is similar to that of a case where a message is received from other vehicle-mounted devices (refer to "6-2. Process upon reception of message"). Since messages are collected at the filter server 105 from many vehicle-mounted devices, a message not possessed by the host node can be acquired from the filter server 105.

8. Process by Filter Server

Message information is transmitted to the filter server 105 from many vehicle-mounted devices. The present system is configured such that a message posted from a user is ultimately posted to a message posting service such as a social networking service. To this end, the filter server 105 posts received message information to the message posting server 106.

In doing so, in order to prevent information already posted from being repetitively posted, the filter server 105 manages which messages have been posted. This may performed by the filter server 105 by, when storing a message, providing the message with an uploaded flag, and raising the flag once the message is posted to the message posting server 106.

In addition, also favorably, the filter server 105 transmits stored message information to the vehicle-mounted device 110 when communicating with the vehicle-mounted device 110. Which message is to be transmitted may be decided as appropriate. For example, conceivably, a message with a relatively recent initial message registration date/time may be transmitted. In addition to such a method, conceivably, message information with a high possibility of not being possessed by the vehicle-mounted device 110 may be transmitted using summary information in a similar manner to vehicle-to-vehicle communication.

<Working Effects of Present Embodiment>

In the present embodiment, using summary information that counts messages for each group, a trend of information possessed by a communication partner node can be revealed and information that differs from the information possessed by the partner can be transmitted. Therefore, messages can be shared among vehicles in an efficient manner. By using a special hash function such as LSH as a hash function that is applied when calculating a group ID based on a message, message exchange that takes not only identity but also similarity into consideration can be performed. In the present embodiment, since a counter is used for summary information, a counter value can be increased or reduced in accordance with addition to or deletion from possessed data. Therefore, even when a need to delete possessed data arises, the summary information correctly reflects a trend of possessed information.

In addition, by performing communication using Wi-Fi Direct and performing transmission order control in communication among vehicle-mounted devices, effects of suppression of conflicts of transmission and introduction of communication cycles are produced. The suppression of conflicts of transmission contributes to improving throughput of communication. In addition, by introducing communication cycles, timings at which messages are to be transmitted using summary information can be clarified.

Furthermore, in the present embodiment, utilizing the efficient information sharing method among vehicles, an information sharing system for use in disasters is proposed. When a disaster strikes, it is assumed that the communication infrastructure sustains damage such that mobile phone networks and Internet access points are virtually rendered unusable. In such circumstances, by using a vehicle-mounted device as an AP to communicate with a user terminal and accept a message from a user, and exchanging and spreading messages by P2P communication among vehicles, a message may be delivered to a user at another location or a vehicle having discovered an Internet connection can post a message onto the Internet. In other words, with the information sharing system according to the present embodiment, information effective to a user can be provided via vehicles.

<Modifications>

The description provided above simply represents one embodiment of the present invention and is not intended to limit the present invention. Various modifications can be made to the present invention within the scope of technical ideas of the invention.

For example, a message exchange (message selection and transmission) method based on summary information can be effectively applied to systems other than the information sharing system for use in disasters described above. In other words, the method can be effectively applied to purposes of transmitting data with a high possibility of not being possessed by a partner when data possessed by two or more arbitrary nodes differ from each other. In doing so, while transmission order control is performed in the description given above, this process is not essential and transmission may be performed at an arbitrary timing by each node. Furthermore, although an object in the description given above is to exchange messages until data possessed by all nodes becomes identical, identity of all of the nodes need not necessarily be the object. For example, when the message exchange method is applied to a case where two vehicles pass each other, even if there is not enough time to cause possessed data to be identical, the probability that data not possessed by a partner can be transmitted increases.

While data is exchanged among three or more vehicle-mounted devices in the description given above, data may be exchanged between two vehicle-mounted devices (or any wireless communication devices). In this case, since the message exchange constitutes one-to-one communication, it should be obvious to a person skilled in the art that a communication control system that is simpler than the communication control used in the embodiment described above can be adopted.

In addition, while summary information of a plurality of other vehicle-mounted devices is totaled and a message of a group with a smaller number of messages in the summary information after cumulation is transmitted in the embodiment described above, which message to be transmitted may instead be decided by other methods. For example, after comparing summary information of another node with summary information of a host node, a message belonging to a group for which the host node possesses more data than the other node may be preferentially transmitted. This is because, even for such a group, the possibility of the host node possessing a message that is not possessed by the other node is conceivably high. Conceivably, such a selection method is particularly effective when there is a smaller number of surrounding nodes.

Furthermore, while summary information and message information are collectively transmitted in the description given above, summary information and message information may be respectively transmitted at different timings. For example, conceivably, after exchanging summary information with each other, message information may be exchanged.

Moreover, information that is transmitted in a message exchange method based on summary information need not be limited to message information as in the present embodiment and may be any data. Transmission information need not necessarily be a text message and the various fields described in the present embodiment need not be provided.

REFERENCE SIGNS LIST

101 Vehicle
102 User terminal
103 User
104 Network
105 Filter server
106 Message posting server
110 Vehicle-mounted device
210 Communication managing unit
220 Message managing unit
230 Message storing unit

The invention claimed is:

1. A data transmission device that transmits data to another node, the data transmission device comprising:
   a memory storing the data;
   a processor operatively coupled to the memory, the processor being programmed to:
      classify the data stored in the memory into a plurality of groups according to a predetermined classification criteria, and generate first summary information that includes: (i) a number of pieces of data included in each group, and (ii) identification information of each group;
      transmit the generated first summary information to the another node;
      receive second summary information that is generated by the another node according to the predetermined classification criteria;
      select data to be transmitted to the another node based on the second summary information received from the another node, the data being preferentially selected from a group having a smaller number of pieces of data; and
      transmit the selected data to the another node.

2. The data transmission device according to claim 1, wherein the processor is further programmed to:
   receive summary information from a plurality of other nodes, and
   sum the numbers of pieces of data of each group included in the summary information received from the plurality of other nodes, and preferentially select data included in a group having a smaller number of pieces of data after summation as data to be transmitted.

3. The data transmission device according to claim 1, wherein the processor is further programmed to:
   preferentially select a group having a greater difference between a sum of the numbers of pieces of data of all groups and the number of pieces of data of the group, and select data belonging to the selected group.

4. The data transmission device according to claim 3, wherein the processor is further programmed to:
   not consider data transmitted within a most recent prescribed period of time as a target for the selection.

5. The data transmission device according to claim 1, wherein the processor is further programmed to:
   transmit summary information stored in the summary information storing unit to the other node.

6. The data transmission device according to claim 1, wherein the processor is further programmed to:
   select data to be transmitted based on the summary information stored in the summary information storing unit in addition to the summary information transmitted from the other node.

7. The data transmission device according to claim 6, wherein the processor is further programmed to:
   compare summary information received from another node and summary information stored in the memory, and to preferentially select data included in a group for which the number of pieces of data possessed by the other node is smaller than the number of pieces of data possessed by a host node.

8. The data transmission device according to claim 1, wherein
   the processor is further programmed to:
      receive data from another node or a user, and
   the data transmission device further comprises data managing memory storing, in a case where data is received by the processor, the data in the memory and updating the summary information.

9. The data transmission device according to claim 8, wherein
   the data managing memory is further adapted to classify the data using a hash value obtained by applying a hash function to data as a group ID.

10. The data transmission device according to claim 9, wherein
    a hash function with a high probability of a same hash value obtained from similar data is used as the hash function.

11. The data transmission device according to claim 8, wherein
    when enough space in the capacity of the memory is unavailable when storing data received by the processor in the memory, the data managing memory deletes data from the memory and updates the summary information.

12. The data transmission device according to claim 8, wherein
    when the number of pieces of data of a group to which data received from the processor belongs in the summary information stored in the memory is equal to or greater than a prescribed number when storing the data in the memory, the data managing memory deletes data belonging to the group from the memory.

13. The data transmission device according to claim 1, wherein
    when the numbers of pieces of data in each group included in the summary information received from the other node and the summary information stored in the memory are identical, data is not transmitted.

14. The data transmission device according to claim 13, wherein
    when the number of pieces of data stored in the memory is smaller than a prescribed threshold, data is not transmitted when a condition, under which the data stored in the memory has been transmitted at least once within a most recent prescribed period of time, is further satisfied.

15. The data transmission device according to claim 1, wherein the processor is further programmed to:
    transmit data and summary information in a transmission period assigned to a host node.

16. A data sharing system comprising:
    a plurality of data communication devices and in which data is shared among the respective data communication devices, each data communication device including:
       a memory storing the data;
       a processor operatively coupled to the memory, the processor being programmed to:
          classify the data stored in the memory into a plurality of groups according to a predetermined classification criteria, and generate first summary information that includes: (i) a number of pieces of data included in each group, and (ii) identification information of each group;
          transmit the generated first summary information to another data communication device;
          receive second summary information that is generated by the another data communication device according to the predetermined classification criteria;

select data to be transmitted to the another data communication device based on the second summary information received from the another data communication device, the data being preferentially selected from a group having a smaller number of pieces of data; and transmit the selected data to the another data communication device.

17. The data sharing system according to claim 16, in which a message input from a user terminal is exchanged among the plurality of data communication devices, and which provides the message to other user terminals, further comprising a plurality of user terminals, wherein each user terminal includes:
the processor programmed to:
accept an input of a message from a user;
transmit the message to a data communication device; and
receive a message from a data communication device and outputting the message to a user, the processor of each of the data communication devices is further adapted to receive a message from the user terminals, and the transmitting unit of each of the data communication devices is further adapted to transmit the selected data to the user terminals.

18. A data sharing method for a communications network having a host node and another node, the data sharing method comprising:

classifying data stored in a memory of the host node into a plurality of groups according to a predetermined classification criteria, generating first summary information that includes: (i) a number of pieces of data included in each group, and (ii) identification information of each group;

transmitting the generated first summary information to the another node;

receiving second summary information that is generated by the another node according to the predetermined classification criteria;

selecting data, by the host node, to be transmitted to the another node based on the second summary information received from the another node, the data being preferentially selected from a group having a smaller number of pieces of data; and transmitting the selected data to the another node.

19. The data transmission device according to claim 1, wherein the predetermined classification criteria corresponds to a hash function, and the data stored in the memory is hashed into the plurality of groups based on the hash function.

20. The data sharing system according to claim 16, wherein the predetermined classification criteria corresponds to a hash function, and the data stored in the memory is hashed into the plurality of groups based on the hash function.

* * * * *